United States Patent
Tsubono et al.

(10) Patent No.: US 8,011,264 B2
(45) Date of Patent: Sep. 6, 2011

(54) MECHANISM FOR CONVERTING ROTARY MOTION INTO LINEAR MOTION

(75) Inventors: Isamu Tsubono, Ushiku (JP); Junichi Tamamoto, Kasumigaura (JP); Makoto Yamakado, Tsuchiura (JP); Tooru Takahashi, Hiratsuka (JP); Yukio Sudo, Aikawa (JP)

(73) Assignee: Hitachi, Ltd., Tokyo (JP)

( * ) Notice: Subject to any disclaimer, the term of this patent is extended or adjusted under 35 U.S.C. 154(b) by 1053 days.

(21) Appl. No.: 11/269,628

(22) Filed: Nov. 9, 2005

(65) Prior Publication Data

US 2006/0117888 A1    Jun. 8, 2006

Related U.S. Application Data

(63) Continuation-in-part of application No. 11/121,015, filed on May 4, 2005, now abandoned.

(30) Foreign Application Priority Data

May 10, 2004   (JP) .................................. 2004-139914
May 24, 2005   (JP) .................................. 2005-151147

(51) Int. Cl.
    *F16H 55/02*   (2006.01)
    *F16H 55/18*   (2006.01)
(52) U.S. Cl. ........................... 74/424.91; 74/441
(58) Field of Classification Search ............... 74/424.91, 74/424.92, 424.93, 89.42, 440, 441; 475/228, 475/333
    See application file for complete search history.

(56) References Cited

U.S. PATENT DOCUMENTS

| | | | | | |
|---|---|---|---|---|---|
| 2,441,168 | A | * | 5/1948 | Richardson | 74/424.91 |
| 2,488,256 | A | * | 11/1949 | Anderson | 74/424.91 |
| 2,525,326 | A | | 10/1950 | Wahlmark | |
| 3,004,445 | A | * | 10/1961 | Mondon | 74/424.92 |
| 3,101,623 | A | * | 8/1963 | Hayes | 74/424.91 |
| 3,508,452 | A | * | 4/1970 | Roantree | 74/424.7 |

(Continued)

FOREIGN PATENT DOCUMENTS

| | | |
|---|---|---|
| DE | 805 832 | 6/1951 |
| JP | 07-165049 | 6/1995 |
| WO | WO 01/90599 A1 | 11/2001 |

OTHER PUBLICATIONS

Office Action issued in German Patent Application No. 10 2005 051 981.4-12 on Dec. 16, 2010.

*Primary Examiner* — Richard W Ridley
*Assistant Examiner* — Phillip A Johnson
(74) *Attorney, Agent, or Firm* — Antonelli, Terry, Stout & Kraus, LLP.

(57) ABSTRACT

Revolving rollers, each provided on an outer peripheral surface thereof with revolving roller grooves extending therearound, are caused to mesh with a rack rod thread of a central rack rod with an axial angle over a lead angle of the rack rod thread and arranged for rotation on a holder member to be twisted. The holder member is rotated round the rack rod by a motor to translate the rack rod. A large thrust can be generated while ensuring a high reliability since a high efficiency is achieved by realizing rolling contact in set points of mesh of the rack rod thread and the revolving roller grooves, points of mesh are made planar, and interference in other points than the points of mesh can be suppressed. Also, play can be restricted by assembling the revolving rollers to the rack rod thread while applying torque in a direction, in which the axial angle is increased.

13 Claims, 28 Drawing Sheets

U.S. PATENT DOCUMENTS

| | | | | |
|---|---|---|---|---|
| 3,861,226 A | * | 1/1975 | Stanley | 74/424.92 |
| 4,383,103 A | | 5/1983 | Kluger | |
| 4,741,250 A | * | 5/1988 | Weyer | 92/33 |
| 4,748,866 A | * | 6/1988 | Weyer | 74/424.92 |
| 4,838,103 A | * | 6/1989 | Weyer | 74/424.92 |
| 4,881,419 A | * | 11/1989 | Weyer | 74/89.42 |
| 5,391,953 A | | 2/1995 | van de Veen | |
| 6,370,978 B1 | * | 4/2002 | Dietrich et al. | 74/424.92 |
| 7,044,017 B2 | * | 5/2006 | Cornelius et al. | 74/424.88 |

\* cited by examiner $\mu_b$: COEFFICIENT OF FRICTION OF BALL

● : POINT OF MESH ON RIGHT FLANK (AXIAL ANGLE 5.07deg > THREAD LEAD ANGLE)
○ : POINT OF MESH ON LEFT FLANK (AXIAL ANGLE 5.07deg > THREAD LEAD ANGLE)
( ⊕ : POINT OF MESH ON RIGHT FLANK (AXIAL ANGLE 4.85deg = THREAD LEAD ANGLE) )
( ⊙ : POINT OF MESH ON LEFT FLANK (AXIAL ANGLE 4.85deg = THREAD LEAD ANGLE) )

MECHANISM FOR CONVERTING ROTARY MOTION INTO LINEAR MOTION

CROSS-REFERENCE TO RELATED APPLICATION

This application is a continuation-in-part of U.S. application Ser. No. 11/121,015, filed May 4, 2005 now abandoned.

BACKGROUND OF THE INVENTION

The present invention relates to a mechanism for converting rotary motion into linear motion, in which a kinetic force is converted between rotary motion and linear motion, and more particularly, to a mechanism for converting rotary motion into linear motion, which is high in conversion efficiency and suited to a power steering device.

In recent years, power steering devices constitute an accessory essential to automobiles. In these power steering devices, in place of conventional hydraulic assist type systems, electrically-driven assist type systems have occupied the main stream in recent years to contribute to energy saving.

By the way, with the electrically-driven assist type systems, it is general to use an electric motor for an assist power source. In the case where a steering device, to which an electric motor is applied, is of a rack and pinion system, linear drive forces are necessary, so that a mechanism that converts rotary motion into linear motion, that is, a so-called mechanism for converting rotary motion into linear motion is used.

Besides, in this case, since it is desirable from the miniaturization point of view to use an electric motor having a high rotating speed, a mechanism uniting with a speed reducer is demanded as a mechanism for converting rotary motion into linear motion, and thus, for example, a ball-screw type mechanism for converting rotary motion into linear motion has been conventionally proposed (for example, see JP-A-7-165049).

With the mechanism or device thus proposed, a threaded rod is connected integrally to a rack in a rack and pinion type steering device, a nut meshes with the rod, and the nut is rotated by an electric motor, which constitutes a rotary power source, to thereby cause the rack to make translation (linear movement).

In this case, since the rack is moved an amount corresponding to a lead of the thread when the electric motor is caused to make one revolution, a large reduction ratio is obtained by decreasing a lead angle whereby the electric motor is increased in rotating speed to achieve miniaturization.

Since a large load acts between the thread of the rod and the thread of the nut, a multiplicity of balls are arranged there and circulated to make rolling contact, thus reducing friction to attain high efficiency.

In the related art, however, means for circulation of the multiplicity of balls is essential, and when circulation of the balls is not smooth, slide friction is generated between the balls and the nut and between the balls and the rack whereby the balls are increased in coefficient of friction to lead to reduction in conversion efficiency.

In particular, in order to make a motor small in size, threads must be made small in lead angle (around 5 degrees in the existing state) in a steering device, which is set to be large in reduction ratio, so that a remarkable decrease in efficiency is resulted as shown in FIG. 10 when balls are increased in coefficient of friction (around 0.01 in the existing state).

FIG. 10 shows the relationship between a lead angle and efficiency of a ball screw mechanism with a coefficient of friction of balls as a parameter. As shown in the figure, it is found that as the coefficient of friction of balls increases from around 0.01, the conversion efficiency decreases.

With the related art, once slippage begins to generate, rolling surfaces of balls begin to roughen, which brings about further slippage to cause a catastrophic, rapid rise in coefficient of friction of balls, thus giving rise to a fear of breakage of the mechanism in a short time.

Therefore, it is a supreme task in such mechanism to maintain a state of circulation of balls favorable at all times, so that high accuracy of balls, nut threads, and rack threads in shape and dimensions is a most important point as well as optimum design of a ball return path, which leads to an increase in cost.

Since a necessary accuracy is rapidly heightened as the balls are increased in number, an actual limit is determined on an upper limit of the number of balls in terms of cost while the number of balls determines a maximum output that can be generated by the mechanism.

Accordingly, with a ball screw mechanism according to the related art, a practically upper limit comes out in transmission force, so that power steering devices making use of the mechanism involve a problem that they cannot be mounted on large-sized cars, of which a large output (rack thrust) is demanded.

BRIEF SUMMARY OF THE INVENTION

It is an object of the invention to provide a mechanism for converting rotary motion into linear motion, which can efficiently accommodate a large thrust.

The object is attained by a mechanism for converting rotary motion into linear motion, the mechanism comprising a rack rod in the form of a round bar, a holder member supported around the rack rod to be rotatable relative to the rack rod, a revolving roller rotatably supported on the holder member, and a rotary power source that rotates the rack rod and the holder member relative to each other, and wherein the rack rod comprises threads on an outer peripheral surface thereof, the revolving roller comprises an annular groove provided on an outer peripheral surface thereof to mesh with the threads of the rack rod and to make a round about the outer peripheral surface of the revolving roller, and a biaxial angle formed between an axial direction of the rack rod and an axial direction of the revolving roller is made the same as a lead angle of the threads of the rack rod, the revolving roller being arranged relative to the rack rod in a twisted manner.

The object is also attained when frictional torque generated at a bearing part that rotatably supports the revolving roller to the holder member is made smaller than frictional torque generated at a mesh part of the threads on the outer peripheral surface of the rack rod and the annular groove of the revolving roller, and the object is also attained when a point of closest approach on an axis of revolution of the revolving roller to be defined as a point near to a rack rod axis being an axis of rotation of the rack rod lies substantially centrally on the axis of revolution of the revolving roller.

Also, the object is attained when at least one of locations of mesh of the revolving roller and the rack rod is made linear.

Likewise, the object is attained when there are mounted a plurality of the revolving rollers, the plurality of the revolving rollers are further arranged at substantially equiangular intervals around the rack rod, and kinds of the revolving rollers are besides made smaller than the number of the revolving rollers as mounted.

Also, a drive force of the rotary power source may be given to the holder member to rotate the holder member to thereby realize rotation thereof relative to the rack rod, axial angle adjustment means that can adjust the biaxial angle after the revolving roller and the rack rod mesh with each other may be provided, or at least the annular groove or grooves of the revolving roller or rollers may be formed from a synthetic resin.

According to the invention, it is possible to generate a large thrust (rack thrust) to provide a mechanism for converting rotary motion into linear motion, which is high in efficiency.

Also, according to the invention, application of a mechanism for converting rotary motion into linear motion, of which a rotary power source comprises a motor, to an automobile steering makes it possible to mount an electrically-driven steering device on large-sized cars.

Other objects, features and advantages of the invention will become apparent from the following description of the embodiments of the invention taken in conjunction with the accompanying drawings.

DETAILED DESCRIPTION OF THE INVENTION

A mechanism for converting rotary motion into linear motion, according to the invention, will be described in detail by way of embodiments as shown.

Here, the mechanism for converting rotary motion into linear motion, according to the invention, is frequently used in power steering devices for automobiles. Hereupon, respective embodiments will be described with respect to the case where the mechanism for converting rotary motion into linear motion, according to the invention, is applied to a rack assist type electrically-driven steering device.

FIGS. 1 to 6 show a first embodiment of the invention. Here, prior to an explanation of the drawings, an explanation will be first given to how elements in the embodiments of the invention correspond to those in a rack assist type electrically-driven steering device.

First, a rack rod in the embodiments of the invention corresponds to a rack in the steering device, a rack screw corresponds to a rack groove, and a rack rod shaft corresponds to a rack shaft. The rack is held by translation bearings to be able to move in an axial direction but not to rotate.

Here, while such translation bearings are not shown, a pinion and a rack serve as the bearings in a rack and pinion type steering device.

Figure 1:
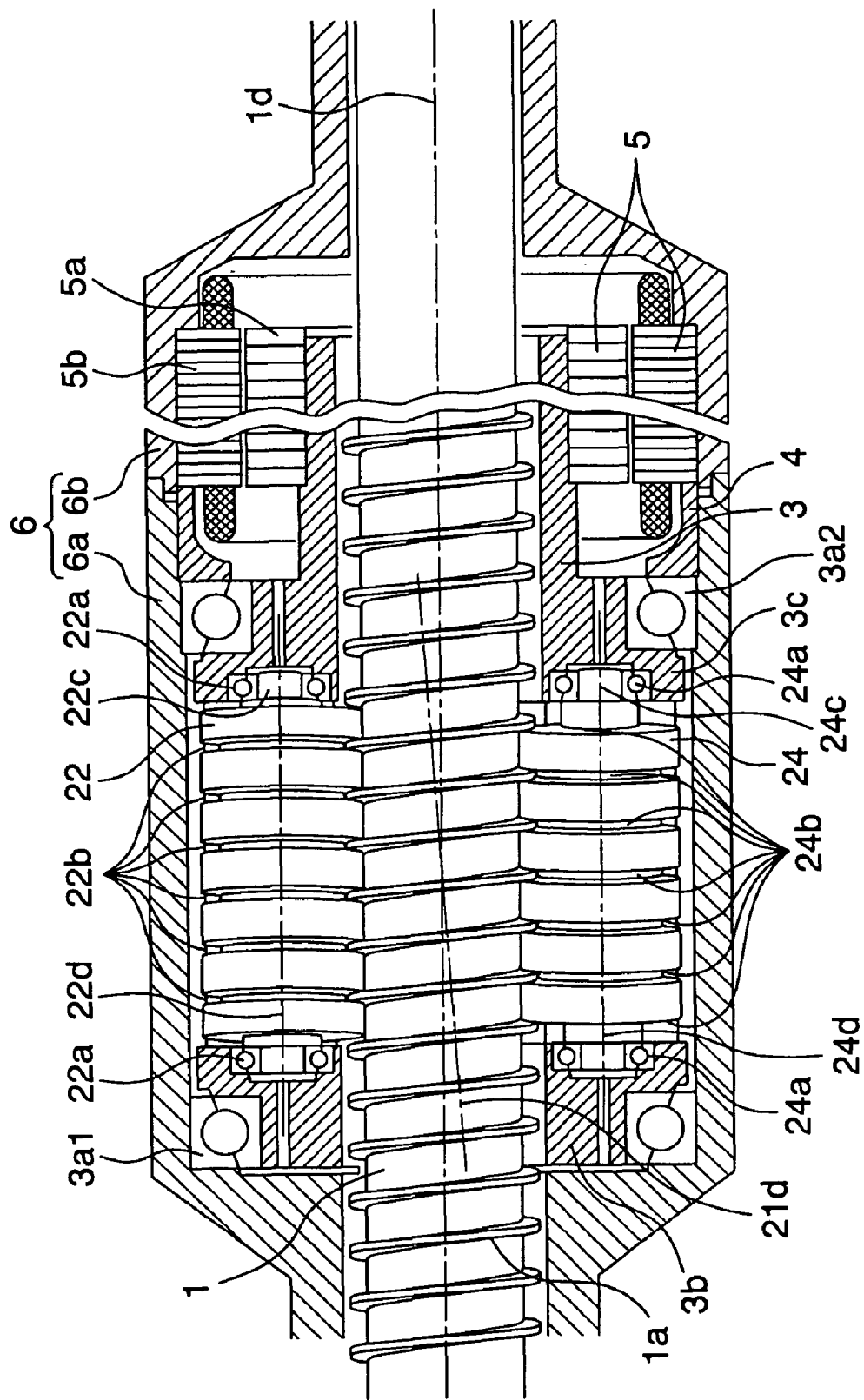
FIG. 1 is a view showing, in cross section, a first embodiment of a mechanism for converting rotary motion into linear motion, according to the invention.
Figure 2:
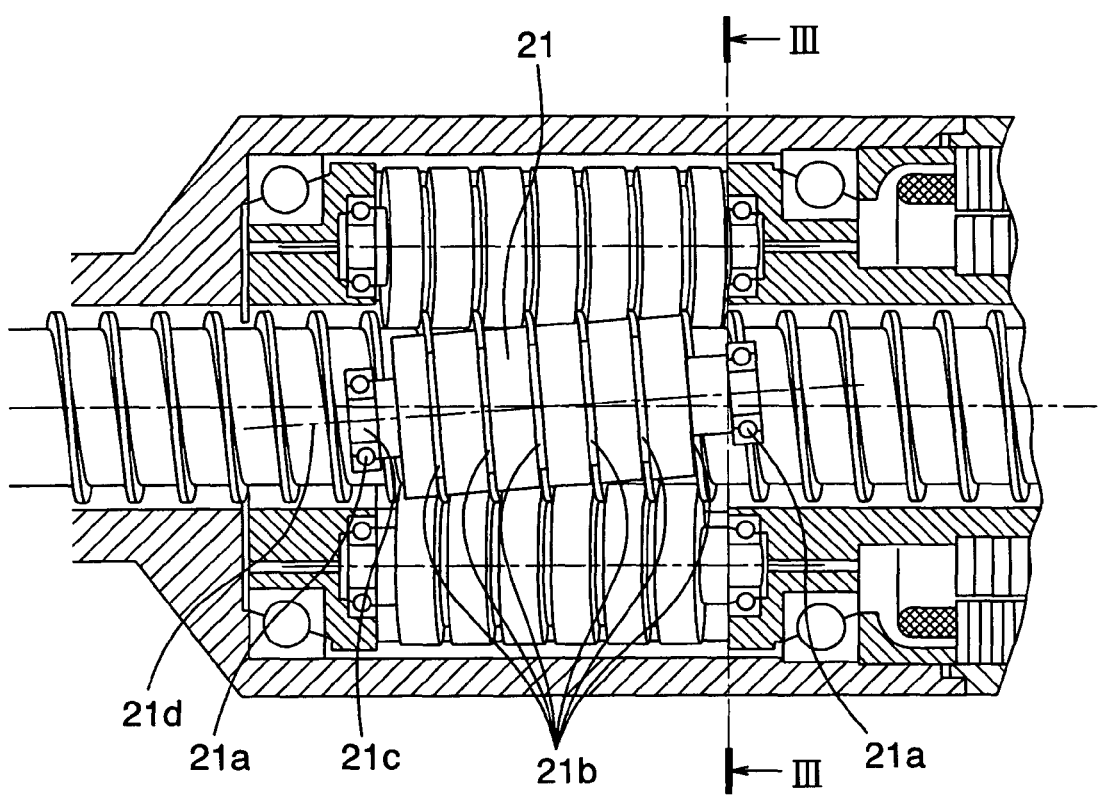
FIG. 2 is a view showing, in another cross section, the first embodiment of the mechanism for converting rotary motion into linear motion, according to the invention.

First, FIG. 1 is a longitudinal, cross sectional view showing a mechanism for converting rotary motion into linear motion, in a rack assist part of an electrically-driven steering device, to which an embodiment of the invention is applied, and FIG. 2 is the same cross sectional view in the case where revolving rollers are arranged this side. So, only parts not shown in FIG. 1 are denoted by reference numerals.

Figure 3:
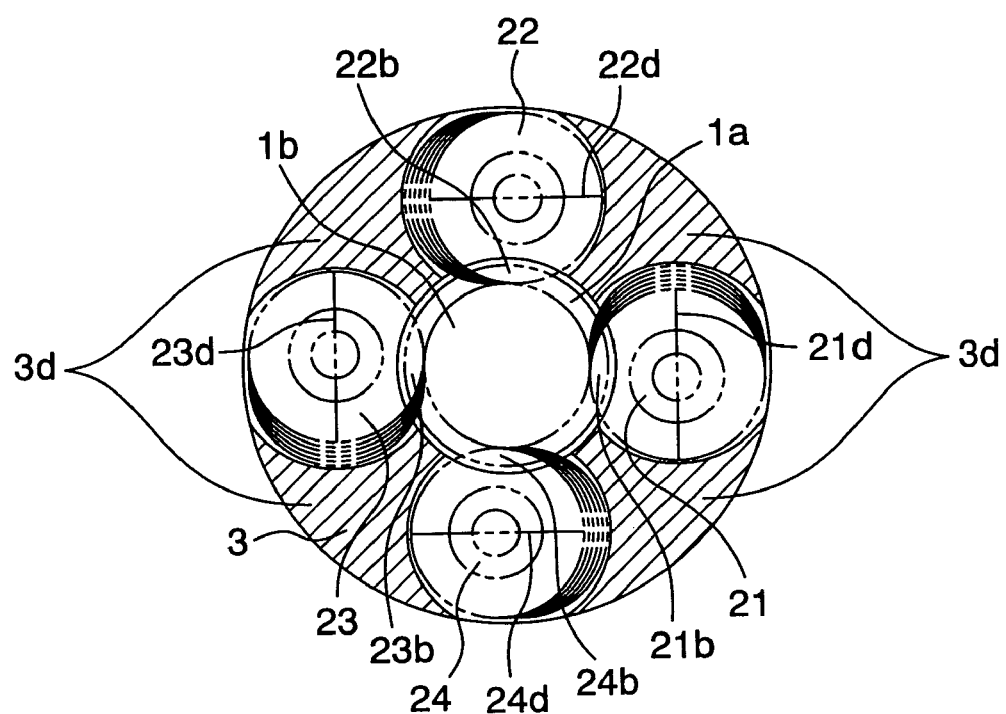
FIG. 3 is a transverse, cross sectional view showing a holder member in the first embodiment of the mechanism for converting rotary motion into linear motion, according to the invention.
Figure 4:
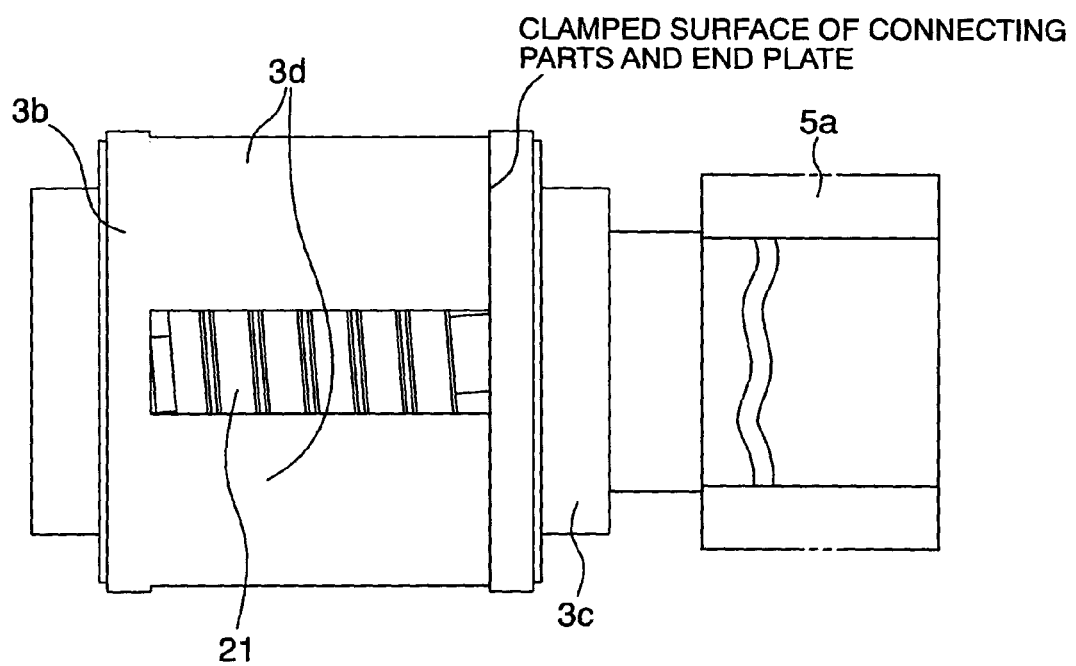
FIG. 4 is a side view showing a state, in which revolving rollers in the first embodiment of the mechanism for converting rotary motion into linear motion, according to the invention are sub-assembled.
Figure 5:
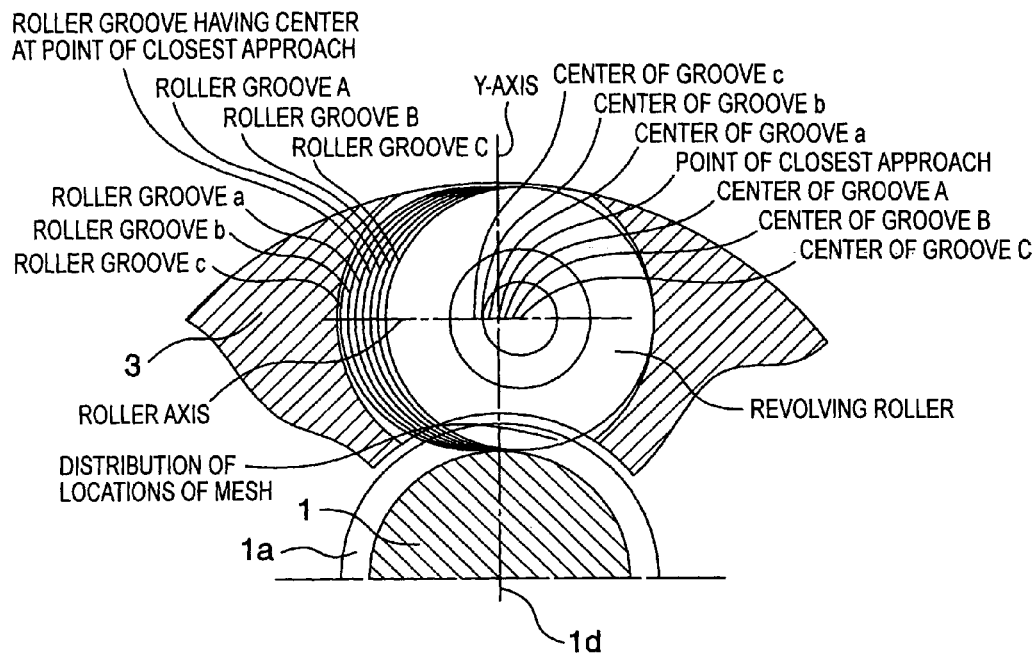
FIG. 5 is a view illustrating the distribution of locations of mesh on the revolving roller as viewed in an axial direction of a rack in the first embodiment of the mechanism for converting rotary motion into linear motion, according to the invention.
Figure 6:
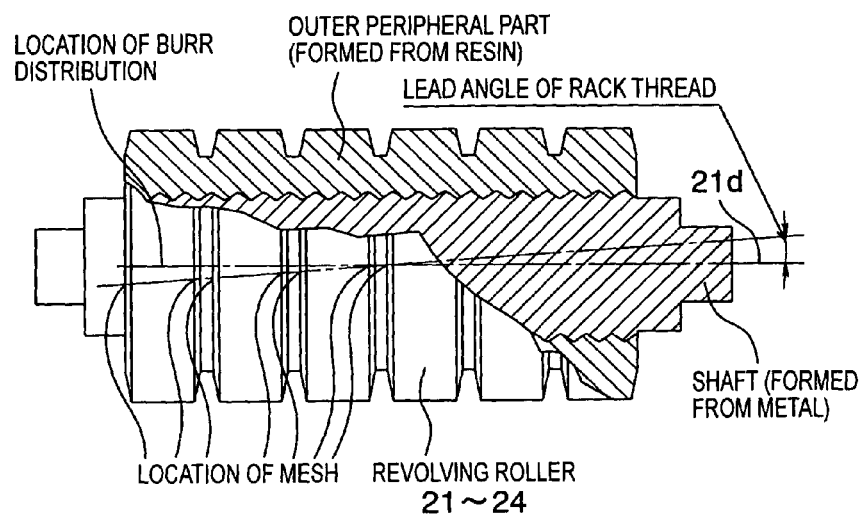
FIG. 6 is a showing, in partial cross section, the revolving roller in the first embodiment of the mechanism for converting rotary motion into linear motion, according to the invention.

Subsequently, FIG. 3 is a transverse, cross sectional view (a III-III cross section in FIG. 2) showing a holder member, and FIG. 4 is a side view showing the holder member, to which the revolving rollers are sub-assembled. FIG. 5 is a view showing the distribution of locations of mesh in one revolving roller as viewed in an axial direction of a rack, and FIG. 6 is a longitudinal, cross sectional view showing the revolving rollers.

First, as shown in FIGS. 1 to 3, according to the embodiment, an outer peripheral surface of a rack rod 1 is threaded to form a rack thread 1a. Here, the rack rod means a rod (round bar) connected to a rack of a rack and pinion type steering device.

In particular, as best shown in FIG. 3, arranged at equiangular intervals of 90 degrees around a rack shaft 1b are four revolving rollers 21, 22, 23, 24, which comprise roller grooves 21b, 22b, 23b, 24b composed of an annular groove to mesh with the rack thread 1a and revolve around the rack shaft 1b, which constitutes a central shaft of the rack rod 1.

At this time, the respective roller grooves 21b, 22b, 23b, 24b are formed as grooves to make rounds of outer peripheral surfaces of the respective revolving rollers, and provided on all the respective revolving rollers 21, 22, 23, 24.

Here, since all the respective roller grooves 21b, 22b, 23b, 24b are arranged on a holder (holder member) 3 in a manner to mesh with the rack thread 1a, angles, which all roller axes 21d, 22d, 23d, 24d of the revolving rollers 21, 22, 23, 24 form to a direction along a rack axis 1d, are made equal to a lead angle of the rack thread 1a as best shown in FIG. 2 with the result that the respective revolving rollers 21, 22, 23, 24 are arranged in postures that are twisted relative to the rack rod 1.

At this time, the revolving rollers 21 to 24, respectively, are supported at both ends 21c to 24c by roller bearings 21a to 24a, each of which comprises an angular ball bearing, and the roller bearings are fitted into the holder 3 whereby all the revolving rollers 21 to 24 can be made to rotate on their own axes.

Here, since thrust loads together with radial loads are applied to the roller bearings 21a to 24a, angular ball bearings capable of bearing loads in both directions are used. The roller bearings are not limited to this type but may of course comprise a tapered roller bearing or a combination of a thrust bearing and a radial bearing. Here, in the case where there is a restriction in diametrical dimension, needle bearings will do.

The holder 3 comprises, as shown in FIGS. 3 and 4, two end plates 3b, 3c that interpose therebetween the revolving rollers 21, 22, 23, 24, and connecting parts 3d that connect the end plates. The connecting parts 3d are formed integral with one 3b of the end plates and clamped to the other 3c of the end plates by screws.

In particular, as shown in FIG. 4, the connecting parts 3d are provided around the rack rod 1 between the respective revolving rollers 21, 22, 23, 24, and mounted in four locations in the embodiment since the four revolving rollers are provided.

Subsequently, a pipe part is extended from one 3c of the end plates in a manner to cover the rack rod 1, and a rotor 5a that constitutes an element of a motor 5 is fixed to the pipe part by means of press fit or shrinkage fit.

The holder 3 is rotatably supported in a casing 6 by holder bearings 3a1, 3a2, and angular ball bearings capable of bearing loads in both directions are used for the holder bearings as shown in the figure since thrust loads together with radial loads are applied to the bearings.

However, the holder bearings are not limited to this type but may of course comprise a combination of a thrust bearing and a radial bearing. Also, the holder bearings 3a1, 3a2, respectively, may of course comprise a double-row angular ball bearing.

In this manner, the holder 3, into which the revolving rollers are assembled, is fixed to and arranged in the casing 6 by a bearing cap 4, and the casing 6 is divided into a holder member casing 6a, into which the holder bearings are fitted, and a motor casing 6b, into which a stator 5b of the motor 5 is press-fitted or shrinkage-fitted.

The holder 3, into which the revolving rollers 21 to 24 are assembled, is mounted to the holder member casing 6a, and then the motor casing 6b is mounted to the holder member casing. Thereby, the stator 5b and the rotor 5a are made opposite to each other to form the motor 5. At the time of assembly, grease is caused to flow appropriately between the elements.

Figure 7:
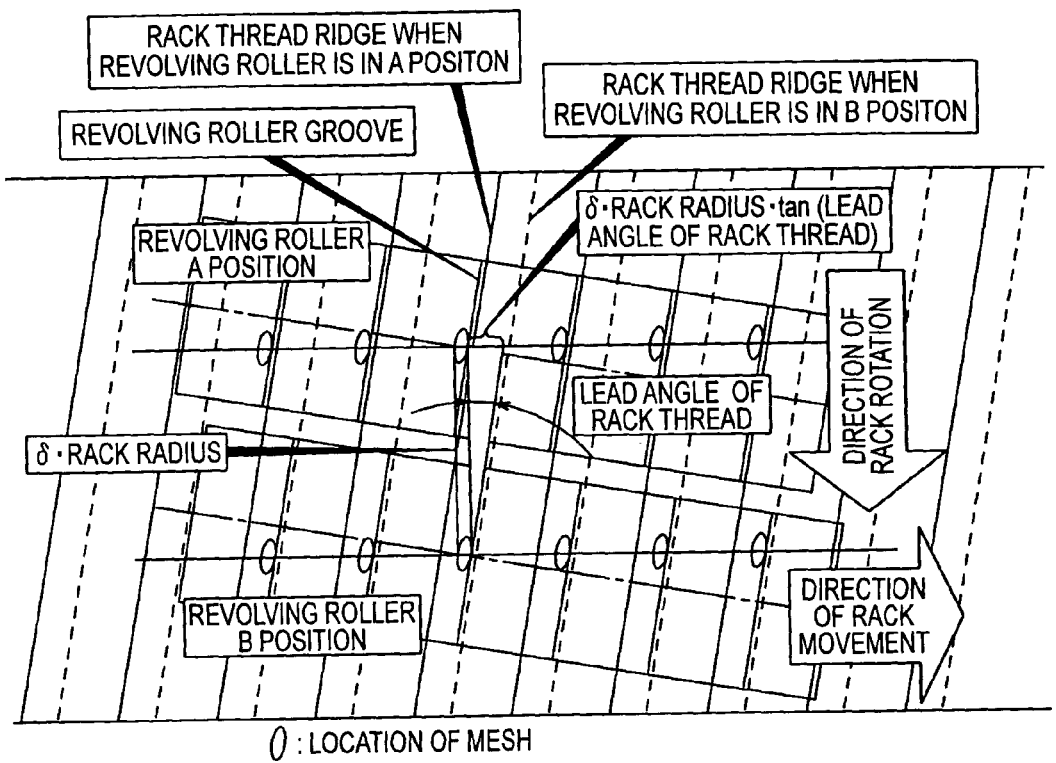
FIG. 7 is a view illustrating an operation of the first embodiment of the mechanism for converting rotary motion into linear motion, according to the invention.

Subsequently, an operation of the embodiment will be described with reference to FIG. 7. FIG. 7 is a view showing, in development, an outer peripheral surface of the rack rod 1 for the purpose of describing the principle of operation.

Assuming that the motor 5 is actuated, the holder 3 rotates about the rack shaft 1b and the four revolving rollers 21 to 24 held on the holder revolve around the rack rod 1.

Then, since the roller grooves 21b to 24b of the respective revolving rollers 21 to 24 mesh with the rack thread 1a of the rack rod 1, the respective revolving rollers are caused by forces from the rack thread to rotate on their own axes.

Here, since the roller grooves 21b to 24b are not in the form of a thread but in the form of a groove that make a round in a plane perpendicular to the roller axis, locations (positions), in which the roller grooves 21b to 24b mesh with the rack thread 1a, are not moved axially even in whatever manner the revolving rollers 21 to 24 rotate on their own axes, and of course axial positions of the roller grooves 21b to 24b are not varied but invariable also at the time of revolution.

Here, thick lines in FIG. 7 indicate thread ridges of the rack thread 1a when the revolving rollers 21 to 24 are disposed in an A position. Let consider the case where the revolving rollers revolve δ radian from the A position to move δ·(radius of the rack shaft) on a circle (a vertical direction in development) of the rack rod to reach a B position.

At this time, positions of the roller grooves are not moved in the direction along the rack axis as described above but moved only in the vertical direction in development. Therefore, in the case where the rack rod is moved δ×(radius of the rack shaft)×tan (lead angle of the rack thread) in an axial direction (a right and left direction in development), the thread ridges are moved to a position indicated by broken lines to maintain mesh of the roller grooves and the rack thread.

Thereby, a rack shift M (referred below to as mechanism pitch) of the motor 5 per revolution is represented by the following formula assuming that δ is 2π.

$$M = 2\pi \times (\text{radius of rack shaft}) \times \tan (\text{lead angle of rack thread}).$$

As apparent from the formula, by making the lead angle of the rack thread small, it is possible to increase a reduction ratio to generate a large rack thrust.

Accordingly, in other words, the invention provides a method of realization of rolling contact through the medium of division of a nut into freely rotating rollers, and it is important that the roller axes 21d, 22d, 23d, 24d of the revolving rollers 21, 22, 23, 24 are deviated an angle equal to the lead angle of the rack thread 1a from the direction of the rack axis 1d.

Here, the revolving rollers 21 to 24 are held on the holder 3 by the roller bearings 21a to 24a to be free to rotate, so that coefficients of friction involved in rotation are remarkably lower than those at locations of mesh.

Therefore, the respective revolving rollers 21 to 24 can rotate on their own axes at those rotating speeds, at which the respective roller grooves 21b to 24b have as small speeds relative to the surface of the rack thread 1a as possible, with the result that substantially rolling contact occurs at locations of mesh, so frictional loss is decreased, and high efficiency is obtained.

At this time, as shown in FIG. 5, locations of mesh on respective roller grooves in one revolving roller are generally distributed in the vicinity of a line (Y-axis), which connects a point of closest approach on the revolving roller and a center of the rack as viewed the direction of the rack axis.

On the other hand, since the roller axes 21d, 22d, 23d, 24d of the revolving rollers 21, 22, 23, 24 are deviated an angle equal to the lead angle of the rack thread 1a from the direction along the rack axis 1d as described above, the roller axes form angles to the rack axis and the more the roller grooves are distant from the point of closest approach, the more central positions of the roller grooves are distant from the Y-axis, so that velocity components of the roller grooves at locations of mesh in a radial direction increase.

Since velocity components of the rack thread at locations of mesh in the radial direction is 0 at this time, velocity components of the roller grooves in the radial direction make sliding velocities as they are to be responsible for frictional loss, with the result that when the roller grooves of the revolving rollers are provided in positions away from the points of closest approach, frictional loss at locations of mesh increases to lead to degradation in performance.

According to the embodiment, however, points of closest approach of the respective revolving rollers 21, 22, 23, 24 to the rack rod 1 are positioned substantially centrally of the revolving rollers, so that there is present no roller groove considerably away from the point of closest approach, which has an advantage that little decrease in efficiency can be generated.

By the way, in the case where thrust (rack thrust) is generated on the rack rod 1, its reaction force is produced in an axial direction of the rack rod 1 and finally applied at those locations, in which the rack thread 1a and the roller grooves 21b to 24b of the respective revolving rollers mesh with each other.

According to the embodiment, since a plurality of the roller grooves are provided on one revolving roller, locations of mesh are increased according to the number of the grooves, with the result that it is possible to bear a large load.

According to the embodiment, since the plurality (here, four, that is, the revolving rollers 21 to 24) of the revolving rollers are provided, locations of mesh are further increased, according to which it is possible to bear a large load, with the result that it is possible to generate a large rack thrust.

Moreover, according to the embodiment, since the revolving rollers 21 to 24 are arranged at equiangular intervals around the rack rod 1, components in a radial direction (a radial direction about the rack axis 1d), of forces applied on the respective revolving rollers cancel one another and are not exerted outside.

As a result, loads on the holder bearings 3a1, 3a2 are decreased, so that it is possible to use bearings of small load capacities to contribute to reduction in cost and miniaturization and since frictional loss generated there is also decreased, it is also possible to contribute to an improvement in performance.

By the way, mesh at this time is caused by contact between the thread surface of the rack thread 1a and the groove surfaces of the roller grooves 21b to 24b, so that the situation of contact can be freely set according to design of these surfaces, which makes a great difference as compared with the fact that contact at ball parts in a ball screw mechanism is limited to point contact.

Accordingly, according to the embodiment, by designing the groove surface configurations of the closest-approach grooves such that line contact occurs at locations of contact, it is possible to bear a further large load, with the result that it is possible to generate a further large rack thrust.

Subsequently, the revolving rollers 21 to 24 in the embodiment will be described with reference to a cross sectional view of FIG. 6. In the revolving rollers, a shaft part and an outer peripheral part including a roller groove are formed from different materials as shown in the figure such that the former is formed from a material, for example, metal such as aluminum or the like, having a large Young's modulus and the latter is formed from a resin such as engineering plastics.

The embodiment has an advantage that a roller groove part, of which complexity in shape is demanded, can be manufactured by means of die forming of a resin, which contributes to reduction in cost, and one of those parts, which are in mesh with each other, is formed from a resin to be able to accommodate a measure of interference by deformation of the resin, which makes it possible to set a form tolerance in expectation of the deformation, whereby it is possible to avoid play at locations of mesh.

Here, such capability of avoidance of play means that it is possible to avoid presence of that dead zone, in which a steering wheel does not react entirely even when a handle is manipulated, and can contribute to an improvement in feeling of steering.

By the way, while such die forming of a resin involves a problem that burr is generated at joints of a die, burr in this case is distributed in parallel to the roller axis 21d as shown in FIG. 6 when taking account of die drawing. On the other hand, since positions of mesh are not distributed in parallel to the roller axis 21d as apparent from FIG. 7, plural burr portions do not come to locations of mesh even when burr is present, so that there is no fear that failure in mesh occurs.

In this case, however, while the rack thread 1a is formed from a metal, the roller grooves are formed from a resin and need a thickness in reverse proportion to the material strength of the resin, so that while the rack thread 1a can be made thin, there is a need of consideration such as enlargement of intervals (thickness of roller ridges) of the roller grooves.

Here, let consider assembly of the revolving rollers 21 to 24 into the holder 3. At this time, the end plate 3c is temporarily screwed to the connecting parts 3d, which is unified with the end plate 3b, to form a subassembly, the subassembly is inserted into the holder member casing 6a, and the rack rod 1 is screwed centrally of the subassembly.

Thereafter, the connecting parts 3d and the end plate 3c, which have been temporarily screwed together, are once released from clamping, the end plate 3c is somewhat twisted to adjust biaxial angles of the roller axes and the rack axis to decrease play at locations of mesh, and the connecting parts and the end plate are again clamped.

Then, since friction on the bearing parts increases as play is decreased, twist is made appropriate, which means that adjustment of play and efficiency can be made at the final stage of assembly, so that the embodiment has an advantage that it is possible to reduce the degree of play and dispersion in efficiency.

According to the embodiment, since the stator 5b of the motor 5 is provided on the casing 6, the rotor 5a is provided on the holder 3, and while not shown, means for permitting translation but preventing rotation is provided on the rack rod 1 as described above, the rack rod 1 does not rotate but only makes translation, so that an advantage of convenience is produced due to no fear that torque is transmitted to a tie rod mounted on a tip end of the rack rod 1.

Subsequently, a second embodiment of the invention will be described. The embodiment uses, as revolving rollers, drum-shaped revolving rollers 121, 122, 123, 124 having a small outside diameter in those portions of roller grooves 121b, 122b, 123b, 124b, which have centers nearest to points of closest approach, and being increased in outside diameter toward both sides thereof, as shown in FIG. 8, and is the same in other respects as the embodiment described above, and so an explanation is omitted with respect to constructions and operations of the remaining parts.

With the embodiment, which is described above and in which the roller grooves are constant in outside diameter, an upper limit is imposed on the number of locations of mesh as set because the more separate the roller grooves 21b, 22b, 23b, 24b, are from points of closest approach, the smaller regions, in which mesh can be made, and when the roller grooves are too separate from points of closest approach, mesh is made impossible as readily seen from FIG. 5.

Figure 8:
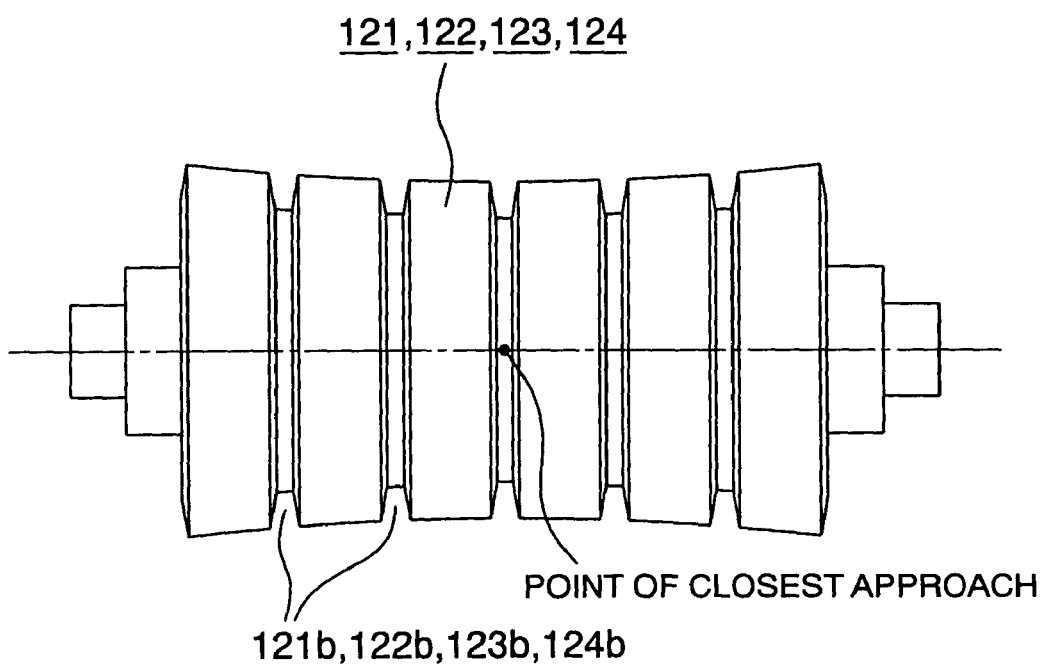
FIG. 8 is a view illustrating a revolving roller in a second embodiment of a mechanism for converting rotary motion into linear motion, according to the invention.

With the embodiment shown in FIG. 8, even when the roller grooves 121b, 122b, 123b, 124b are made separate from points of closest approach, regions of mesh are ensured since the revolving rollers 121, 122, 123, 124 are increased in outside diameter, with the result that locations of mesh per one revolving roller are increased in number to produce a peculiar effect that rack thrust can be further increased.

Subsequently, a third embodiment of the invention will be described. With the embodiment described above, the first revolving roller 21 and the second revolving roller 22 among the four revolving rollers 21, 22, 23, 24 are arranged around the rack rod 1, on which the rack thread 1a composed of a single thread is threaded, in a manner to mesh with the rack thread 1a but not to get out of position in the axial direction.

Therefore, axial positions of the roller grooves 21b, 22b, respectively, provided on the revolving rollers 21, 22 must be changed every roller. As apparent from FIG. 1, the revolving roller 22 disposed above the rack rod 1 is provided on both ends thereof with no mesh surfaces while both ends of the revolving roller 24 disposed below the rack rod 1 serve as mesh surfaces.

This is because the rack thread 1a of the rack rod 1 is worthy of thread to be moved axially by half pitch when it advances 180 degrees, so that in the case where revolving rollers are provided in plural, roller grooves must be made different in axial position, every revolving roller.

That is, with the embodiment described above, it is necessary to manufacture a plurality of revolving rollers, of which roller grooves are different from one another in axial position, so that mass-productiveness is low to be problematic in terms of cost.

Besides, in this case, those points of roller closest approach, which are nearest to the rack shaft 1b, on the roller axes being central axes of the revolving rollers, are all disposed substantially centrally of the revolving rollers, whereby all the roller grooves are positioned differently from the points of roller closest approach, and not put in the same positions, so that groove shape must be designed and manufactured separately every roller groove, which leads to a further increase in cost.

Figure 9:
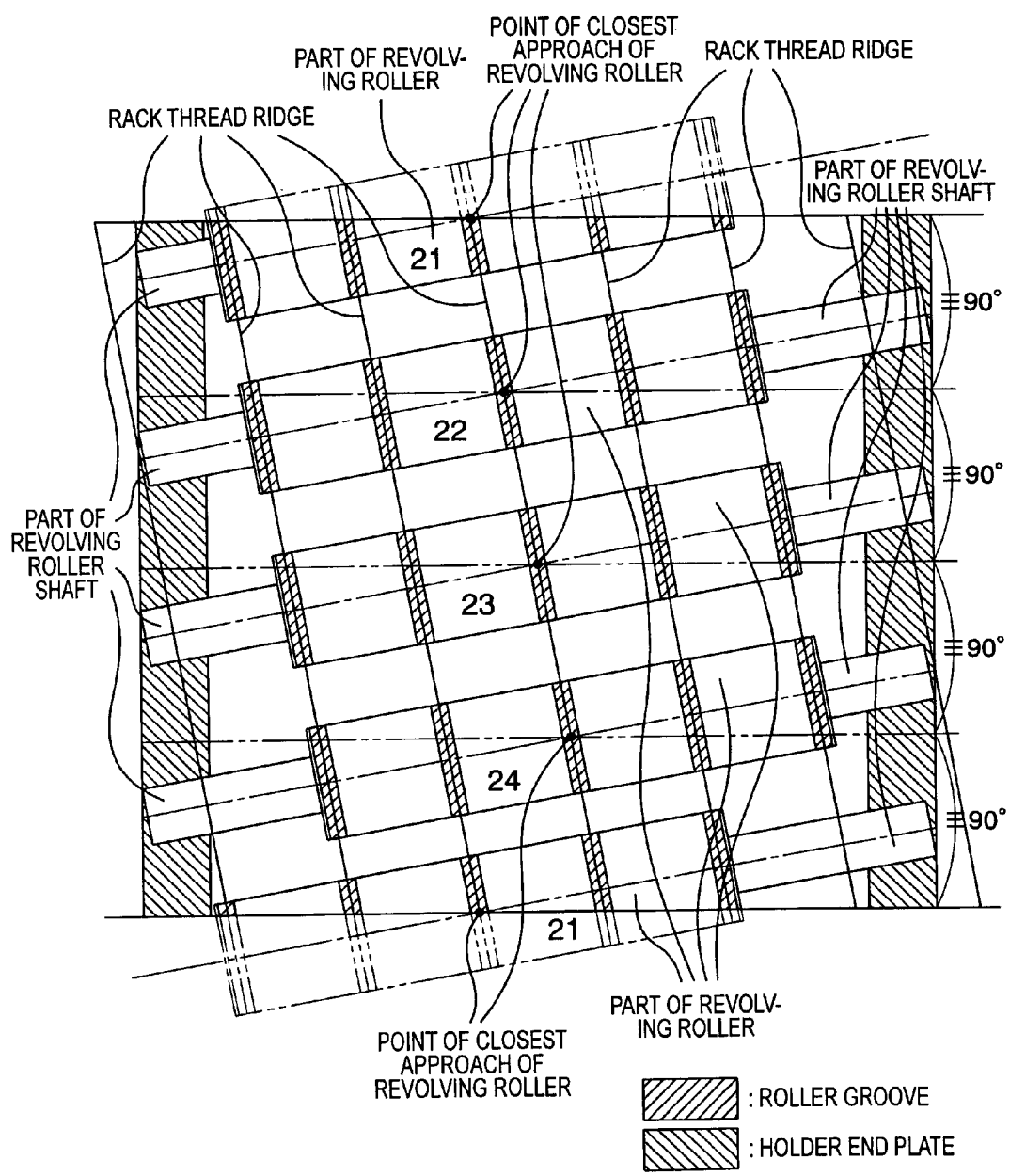
FIG. 9 is a view illustrating an arrangement and an operation of revolving rollers in a third embodiment of a mechanism for converting rotary motion into linear motion, according to the invention.
Figure 10:
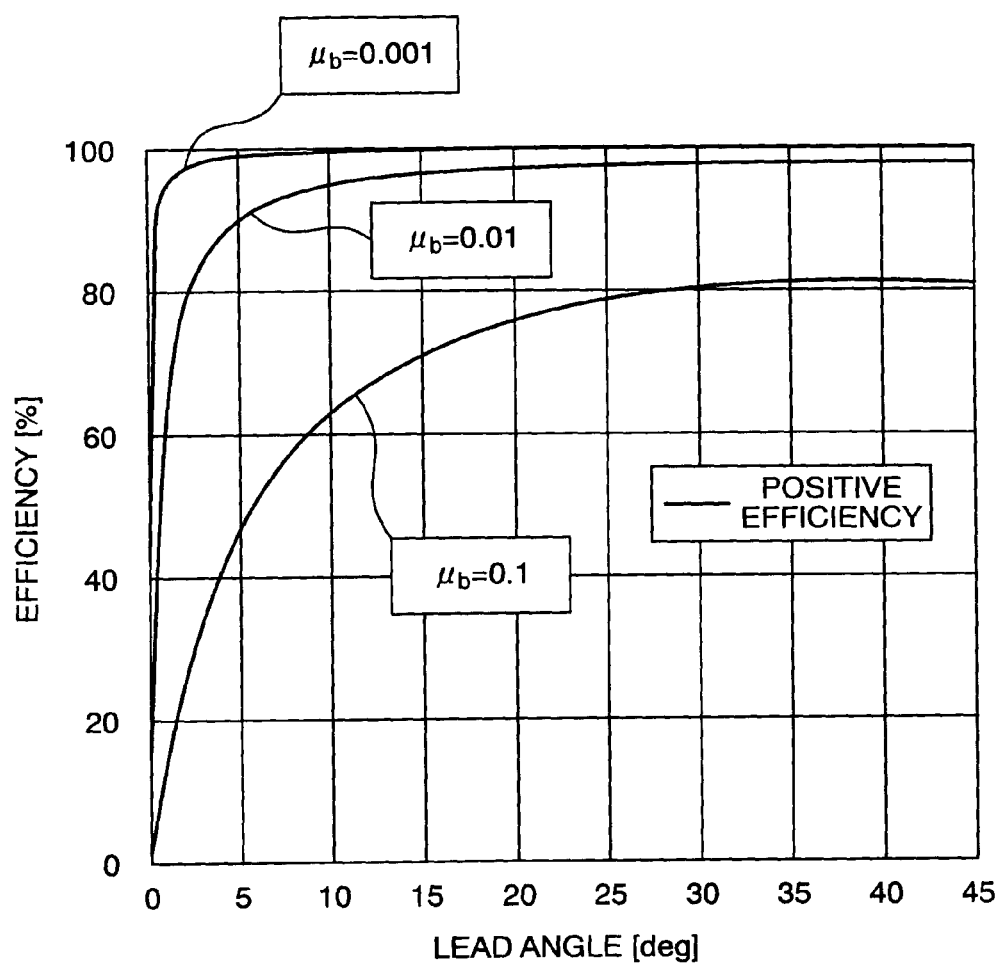
FIG. 10 is a view exemplarily illustrating the characteristics of efficiency of a ball screw mechanism according to the related art.
Figure 11:
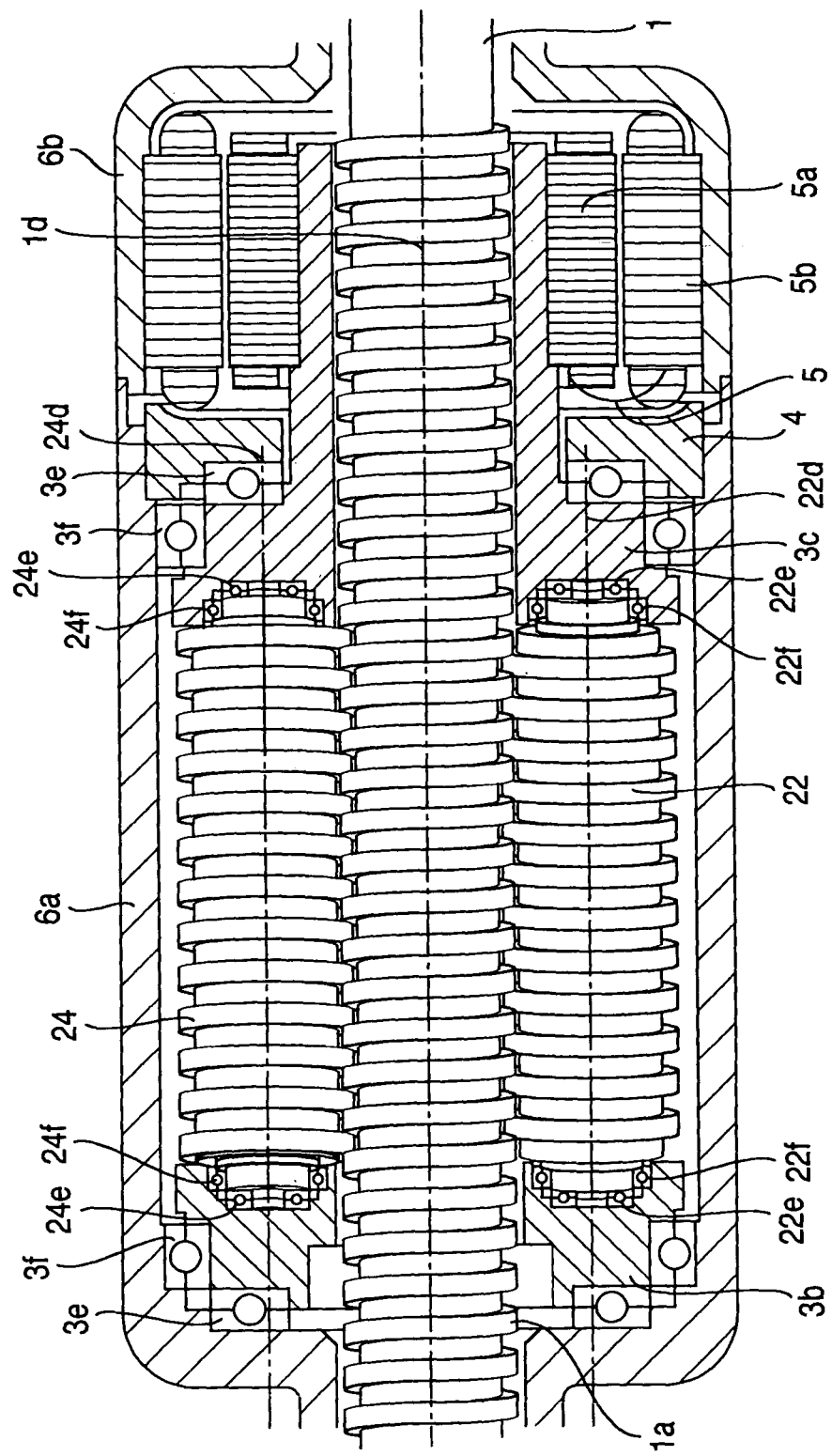
FIG. 11 is a longitudinal, cross sectional view of a fourth embodiment of a mechanism for converting rotary motion into linear motion, according to the invention.

Hereupon, according to a third embodiment, a single kind of revolving roller will do. The third embodiment will be described with reference to FIG. 9. Like FIG. 7, FIG. 9 is also a view, in which a rack thread 1a of a rack rod 1 is developed in plane and revolving rollers 21 to 24 having the same roller groove are successively shifted in an axial direction to be arranged on a holder 3.

In this case, the four revolving rollers are provided and the first revolving roller 21 to the last revolving roller 24 are shifted in this order whereby it suffices to prepare the revolving rollers 21 to 24 having the same roller groove, thus enabling achieving a considerable reduction in cost.

While the revolving rollers 21 to 24, respectively, must be changed in axial length, a considerable reduction in cost can be achieved since roller grooves 21b, 22b, 23b, 24b involving much cost in design and manufacture can be all made the same.

With the third embodiment, all the revolving rollers 21 to 24 have points of closest approach centrally thereof, so that three kinds of shapes are sufficient for the roller grooves, by which a further reduction in cost can be achieved.

With the third embodiment, while the revolving rollers are four in number, the method of shifting the revolving rollers in the axial direction is not limited to the case where the revolving rollers are four in number but can be also carried out in other cases.

Besides, one kind of forming die will do in the case where the revolving rollers are molded from a resin, so that reduction in cost is achieved in this respect.

The construction of the mechanism for converting rotary motion into linear motion, according to a fourth embodiment of the invention will be described. A rack rod thread 1a is formed on an outer peripheral surface of a rack rod 1. Four revolving rollers 21, 22, 23, 24 are arranged at equiangular intervals of 90 degrees about a rack rod axis 1d that makes a central axis of the rack rod 1. Revolving roller axes 21d, 22d, 23d, 24d making central axes of the revolving rollers are arranged to be twisted relative to the rack rod axis 1d (the revolving roller axes and the rack rod axis are not in parallel to each other).

Figure 13:
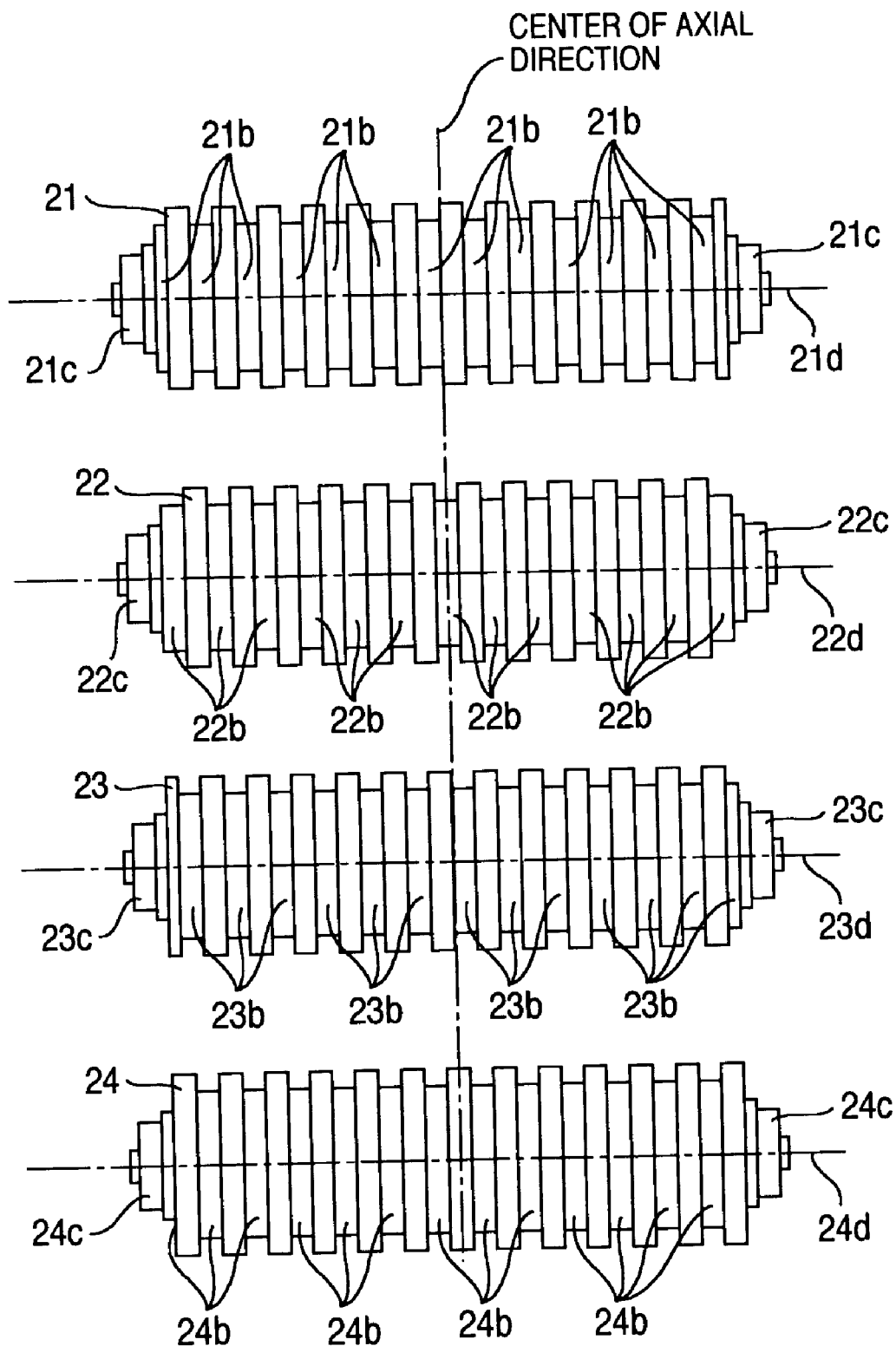
FIG. 13 is a side view showing all the revolving rollers in the mechanism for converting rotary motion into linear motion, according to the first embodiment.
Figure 23:
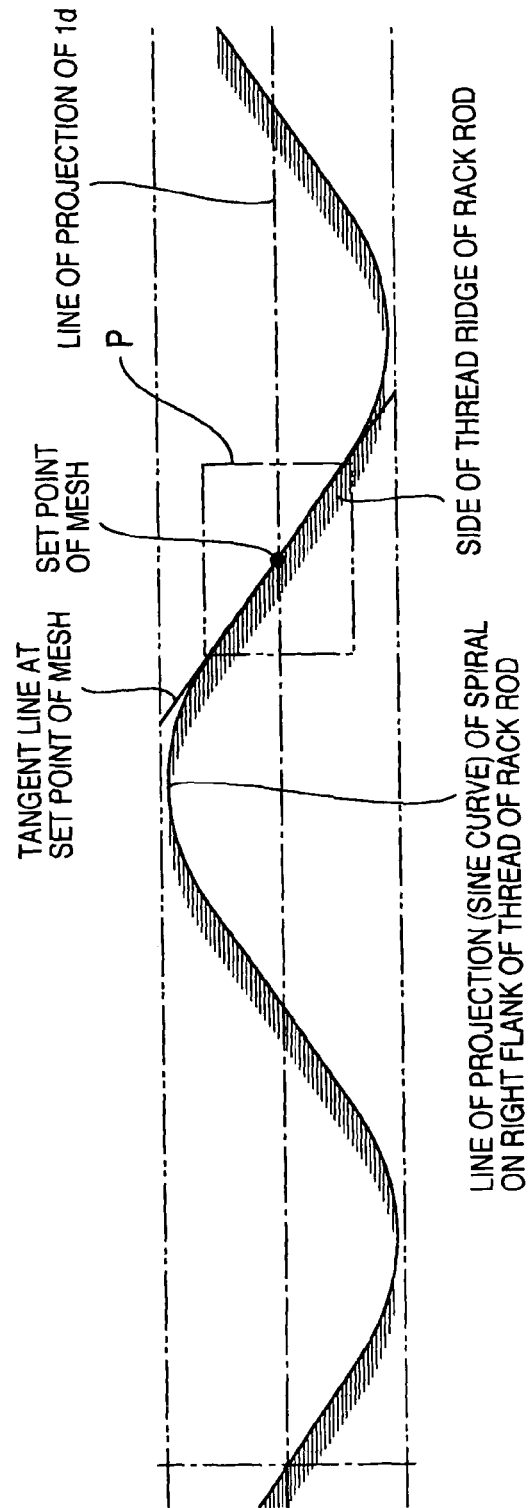
FIG. 23 is a view illustrating a point of mesh according to the related art in comparison with the fourth embodiment.

Here, as best shown in FIG. 23, a plurality of annular grooves 21b, 22b, 23b, 24b are arranged on outer peripheries of the respective revolving rollers to get out of axial position relative to one another (in an example of FIG. 13, adjacent revolving rollers get out of position by approximately ¼ as long as a lead, and strictly, get out of position by {(lead)/4}× Cos (an axial angle between the revolving roller axis and the rack rod axis)). The revolving roller axes 21*d* to 24*d* and the rack rod axis 1*d* are fixedly arranged in postures twisted to each other so that annular surfaces (surfaces provided to stand upright toward annular ridges from bottom surfaces of the annular grooves) on both sides to define the respective annular grooves mesh with both flanks (side surfaces standing upright toward thread ridges from thread grooves of the rack rod thread) of the rack rod thread 1*a*.

At this time, the respective revolving rollers are supported at roller ends 21*c* to 24*c* thereof by revolving roller radial bearings 21*f* to 24*f* and revolving roller thrust bearings 21*e* to 24*e*, and these roller bearings are fitted into a holder member 3 whereby all the revolving rollers 21 to 24 can rotate on their own axes. Here, since a thrust load together with a radial load is applied to the roller bearing, the bearings bearing the loads comprise two types of ball bearings, that is, a radial bearing and a thrust bearing but may comprise one of an angular ball bearing and a tapered roller bearing, which can bear the both loads.

Also, according to the embodiment, since the grooves are angular-shaped, a radial load generated at a portion of mesh becomes very small. Therefore, when a load being born is small in level, a radial load may be born by making a groove of a thrust bearing deep and a radial bearing may be in some cases omitted. In the case where there is a limitation in dimensions, the respective bearings may comprise a needle bearing.

Figure 14:
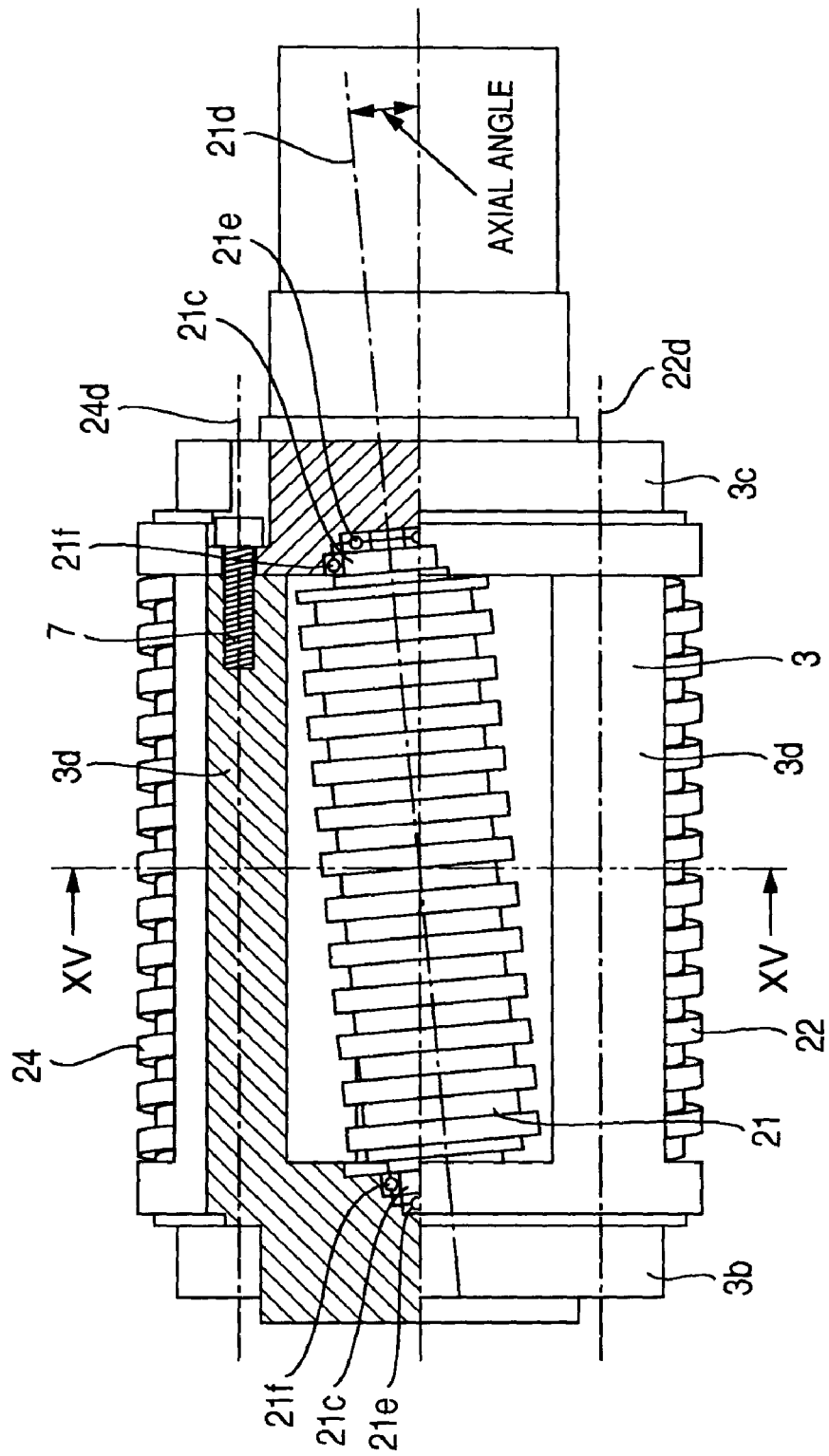
FIG. 14 is a side view showing a subassembly of the revolving rollers and a holder member in the first embodiment (a part of the view is a cross sectional view showing a section taken along the lines XIV-XIV in FIG. 15)
Figure 15:
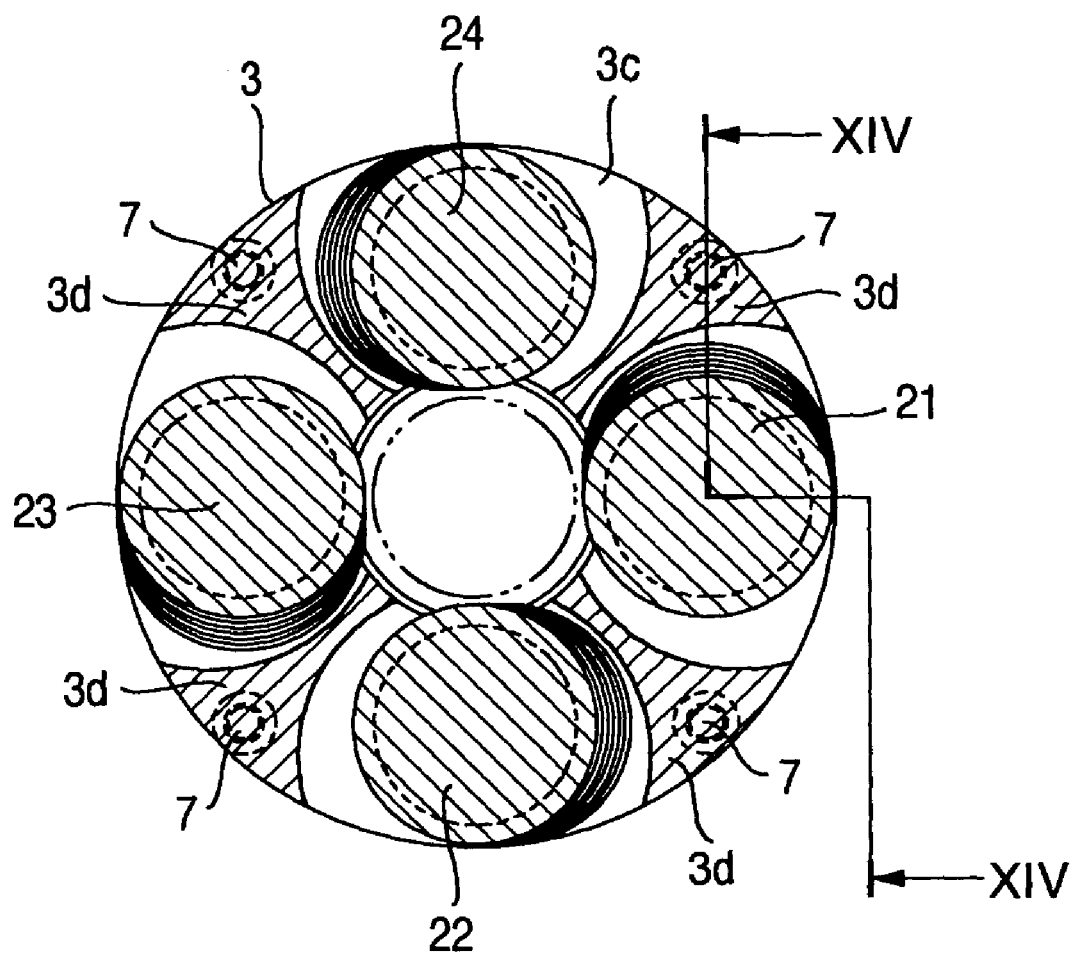
FIG. 15 is a transverse, cross sectional view showing the subassembly of the revolving rollers and the holder member in the first embodiment (a section taken along the line XV-XV in FIG. 14)

The holder member 3 comprises, as apparent from FIGS. 14 and 15, a holder end plate 3*b* and a motor-side holder end plate 3*c*, which interpose therebetween the revolving rollers 21, 22, 23, 24, and holder connecting parts 3*d* that connect the end plates together. The holder connecting parts 3*d* are formed integral with the holder end plate 3*b* and fixed to the other motor-side holder end plate 3*c* by holder connection screws 7. The holder connection screws 7 are threaded into while applying torque on the both holder end plates 3*b*, 3*c* in a direction, in which the revolving rollers are increased in axial angle (this aims at adjustment of dimensional tolerance and reduction of play at the time of assembly by assembling with an angle, which is a little larger than a predetermined axial angle of the revolving rollers). In particular, as shown in FIG. 15, the holder connecting parts 3*d* are provided round the rack rod 1 between the respective revolving rollers 21, 22, 23, 24, and mounted in four locations since the four revolving rollers are provided in the embodiment.

A pipe part is extended from the motor-side holder end plate 3*c* on one side in a manner to cover the rack rod 1, and a rotor 5*a* making a component of a motor 5 is fixed to the pipe part by means of press fit or shrinkage fit. The holder member 3 is rotatably supported in a casing 6 by holder radial bearings 3*f* and holder thrust bearings 3*e*. These bearings may comprise one of an angular ball bearing and a tapered roller bearing. Also, the both holder bearings, respectively, may of course comprise a double-row angular ball bearing.

In this manner, the holder member 3 with the revolving rollers assembled thereinto is fixedly arranged in the casing 6 by a bearing cap 4, and the casing 6 is divided into two parts, that is, a holder member casing 6*a*, into which the holder member bearings are fitted, and a motor casing 6*b*, into which a stator 5*b* of the motor 5 is press-fitted or shrinkage-fitted. The bearing cap 4 is fixedly arranged in the holder member casing 6*a* by caulking or screwing.

The holder member 3 with the revolving rollers 21 to 24 assembled thereinto is mounted to the holder member casing 6*a*, and then the motor casing 6*b* is mounted thereto by screwing or the like. Thereby, the stator 5*b* and the rotor 5*a* are made opposite to each other to form the motor 5. At the time of assembly, grease is caused to appropriately flow between the components. By the way, in order to start an action of conversion of rotary motion into linear motion, a linear movement pair is needed to prevent rotation of the rack rod 1 which is a linear movement part and to allow only linear movement thereof.

Figure 31:
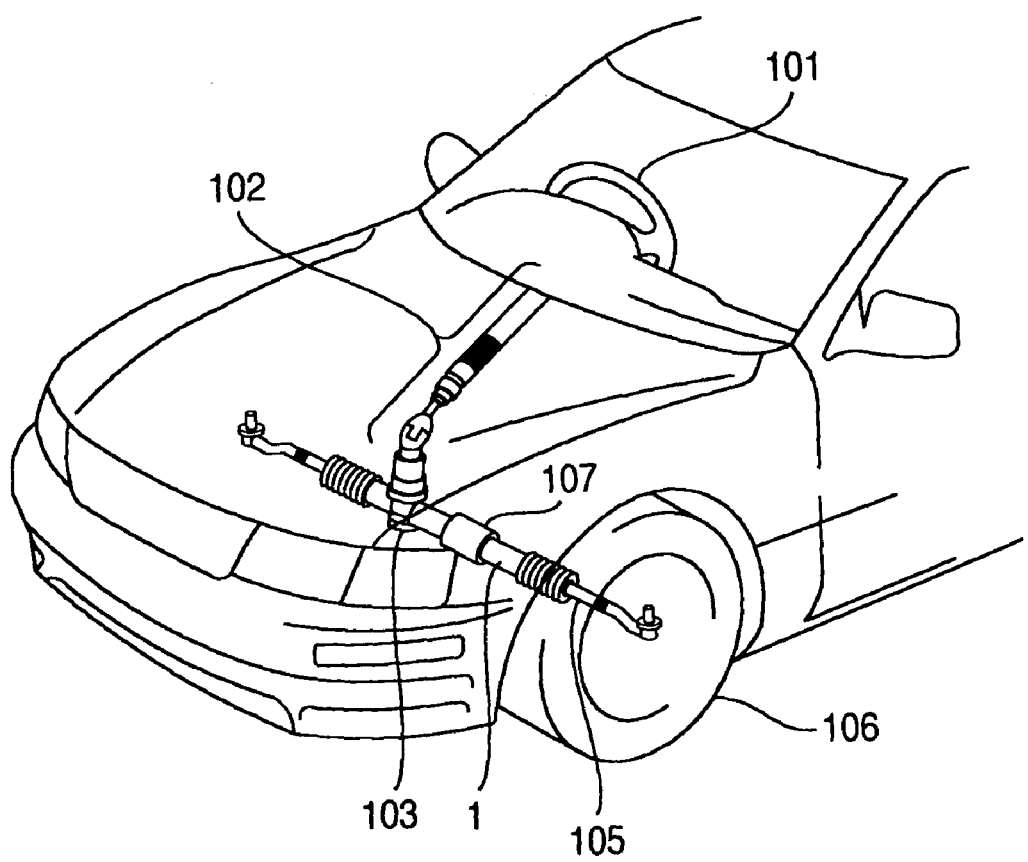
FIG. 31 is a view illustrating a fundamental operation of the mechanism for converting rotary motion into linear motion, according to the invention.

According to the embodiment, the pinion 103 shown in FIG. 31 and a rack provided on the rack rod 1 to mesh with the pinion 103 serve as the linear movement pair. With a system devoid of such linear movement pair, for example, a steer bi-wire system, it is necessary to separately provide a linear movement pair such as a ball slider. With the present steering mechanism, even when a slide pair is provided, in which balls in a slider part are omitted, reduction in efficiency is small since a linear movement part is small in speed. Therefore, a simple joint structure will do in case of attaching importance to cost. This generally applies in the case where a small speed is demanded of a linear movement part in other applications than the steering mechanism. That is, this is the case where the reduction ratio is set to be large, specifically, the case where a lead angle of a rack rod thread is small.

Figure 12:
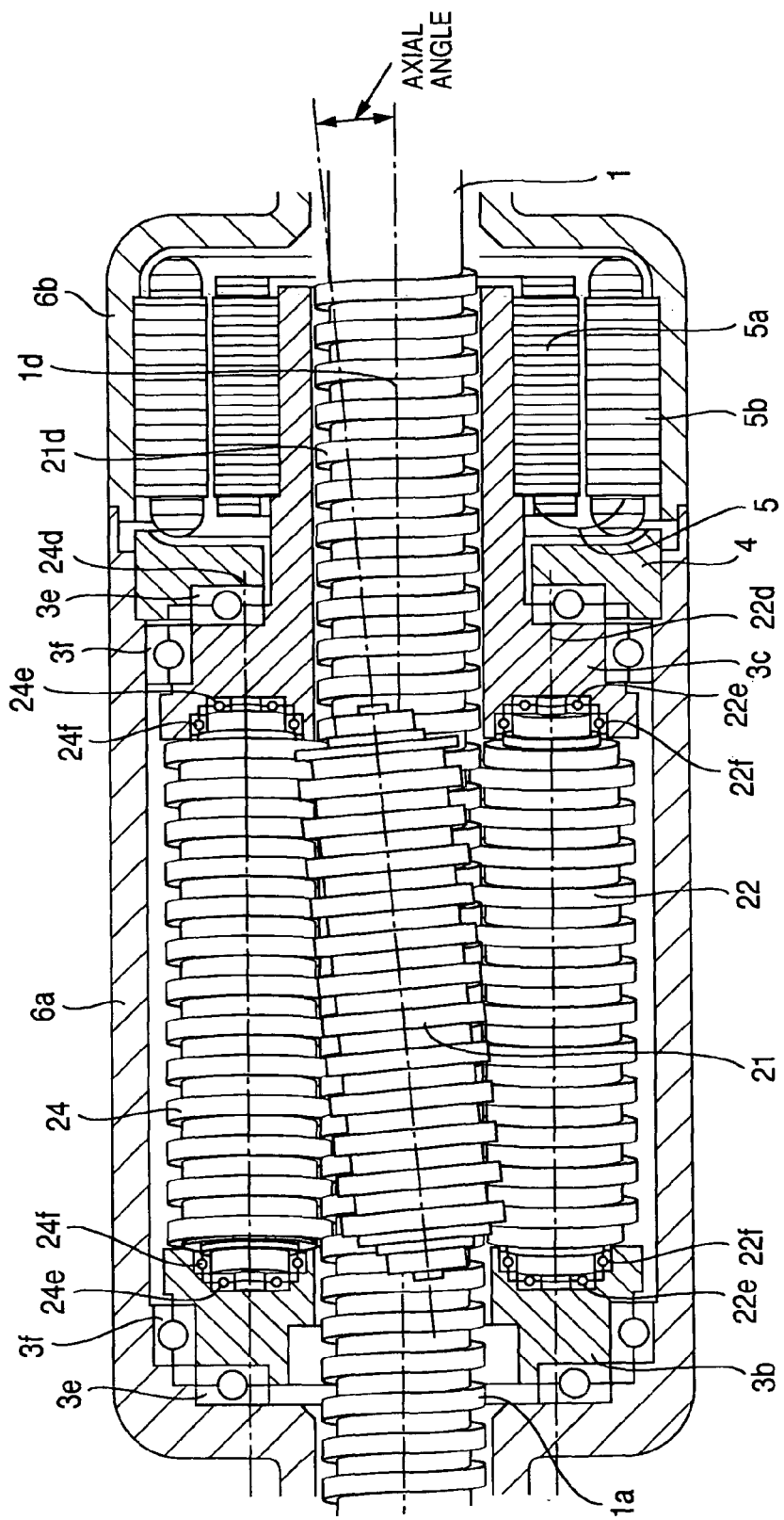
FIG. 12 is a longitudinal, cross sectional view showing a state, in which a revolving roller this side is arranged in a normal posture in the mechanism for converting rotary motion into linear motion, shown in FIG. 11.

One of most important viewpoints in the constitution of the mechanism for converting rotary motion into linear motion, according to the embodiment of the invention, is setting of an axial angle of the revolving roller axis 21*d* to 24*d* relative to the rack rod axis 1*d* (The axial angle is in the range of 0° to 90° and an angle, which when a spatial straight line in parallel to the rack rod axis 1*d* and a spatial straight line in parallel to the revolving roller axis 21*d* to 24*d* are drawn in a manner to pass through the same point, the both spatial straight lines form therebetween. Also, the axial angle can be said to be in the range of 0° to 90° and an angle, which as viewed in a direction along a common perpendicular (only one perpendicular is existent) to the rack rod axis 1*d* and the revolving roller axis 21*d* to 24*d*, the both lines form therebetween. Further, the axial angle can also be said to be in the range of 0° to 90° and an angle, which when the both lines are projected on a common parallel plane (a plane perpendicular to the common perpendicular) of the rack rod axis 1*d* and the revolving roller axis 21*d* to 24*d*, the both lines of projection form therebetween. In this manner, there are definitions of an axial angle from three viewpoints, and the axial angle is shown in FIG. 12 and should be referred to).

Figure 16:
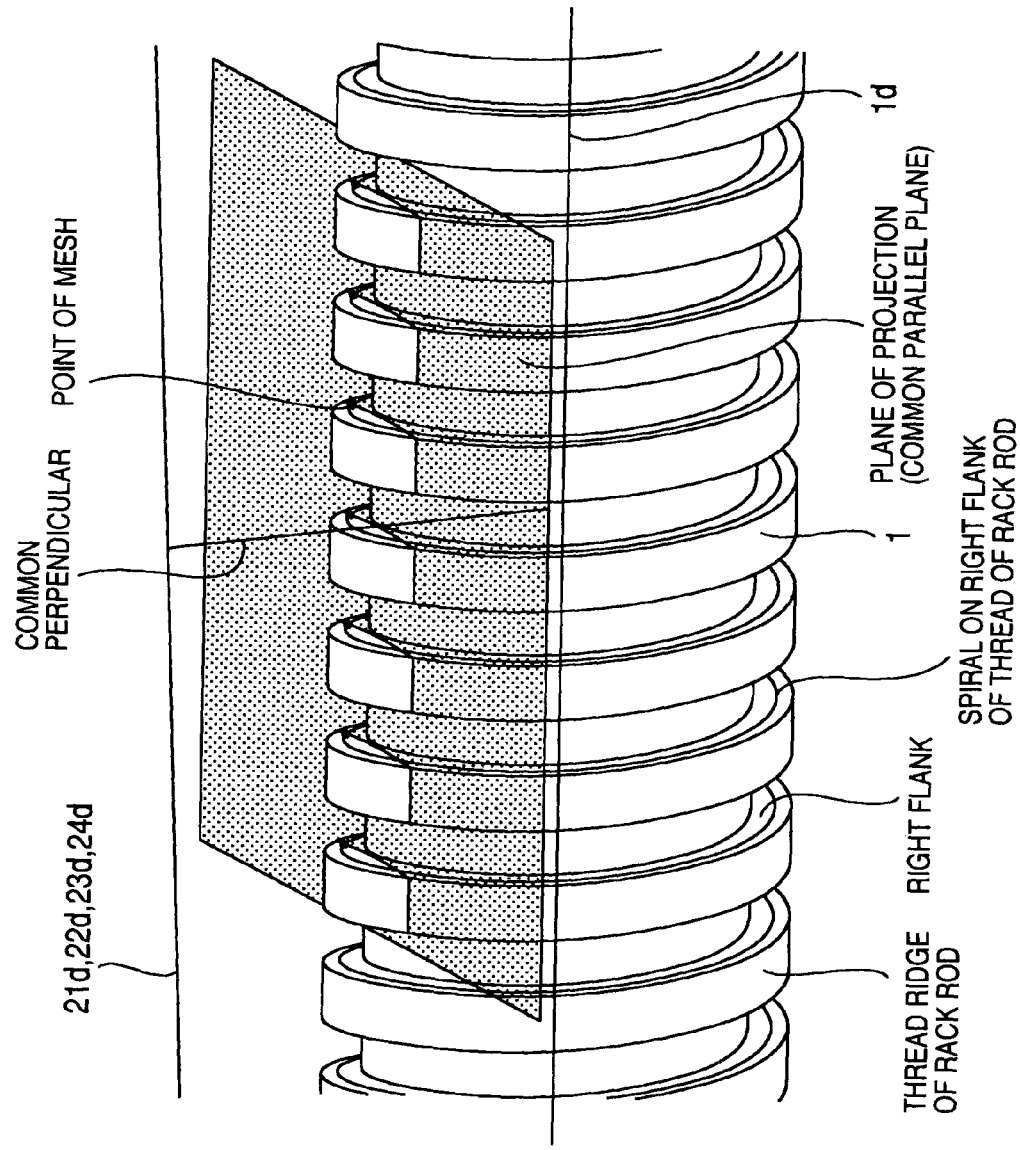
FIG. 16 is a view illustrating a plane of projection of a spiral of a thread of a rack rod in the fourth embodiment.

When axial angles of the revolving rollers are determined, that is, the revolving roller axes are determined in orientation, the revolving roller grooves are determined in direction, so that there can be some cases where the thread 1*a* and the revolving roller grooves 21*b* to 24*b*, which realize favorable mesh, cannot be found when setting of the axial angles is inappropriate. In this manner, a main technical feature of the invention resides in that in the mechanism for converting rotary motion into linear motion, according to the embodiment, an axial angle making a very important design item is not equal to a lead angle (an angle formed between a direction along a cross section perpendicular to the rack rod axis and a direction of the thread grooves as threaded) of the rack rod thread 1*a* but is made larger than the lead angle. The reason why such feature makes it possible to avoid interference near a point, in which the revolving roller and the rack rod thread mesh with each other, will be described below with reference to FIGS. 16 to 20, 23, and 24. Here, for the purpose of making an explanation clear, there will be discussed the case where the revolving rollers 21 to 24 revolve in directions, in which mesh occurs at a right flank (see an illustration of FIG. 16) of the rack rod thread 1*a*.

Figure 17:
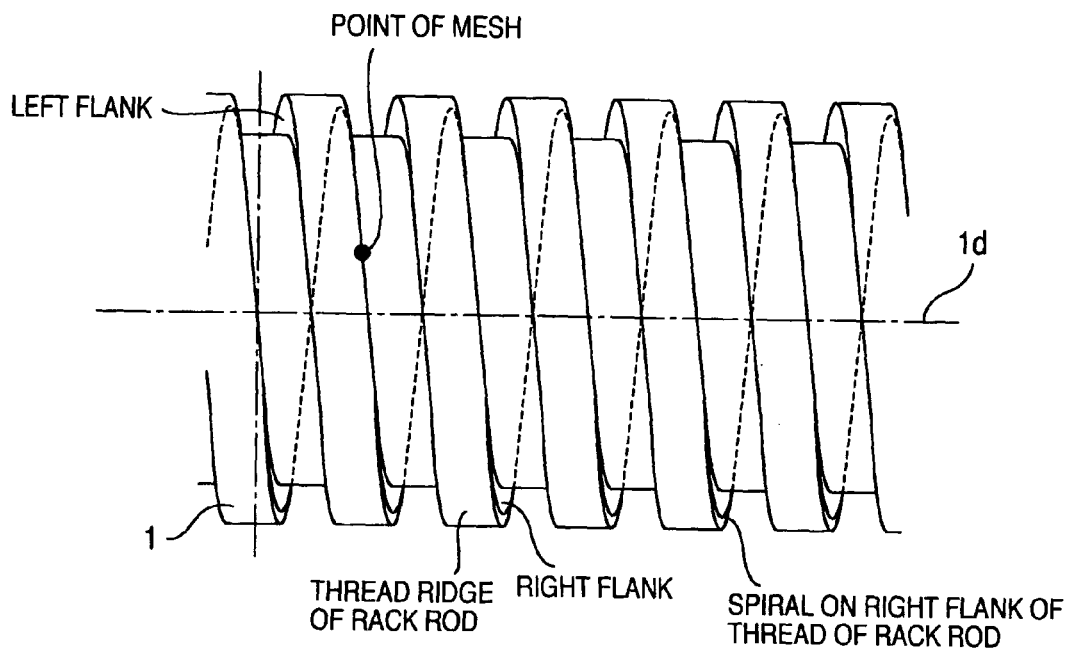
FIG. 17 is a view showing a thread spiral on a right thread flank as viewed in a direction normal to a plane of projection in the fourth embodiment (as viewed from a common perpendicular of an axis of the rack rod and an axis of the revolving roller)
Figure 18:
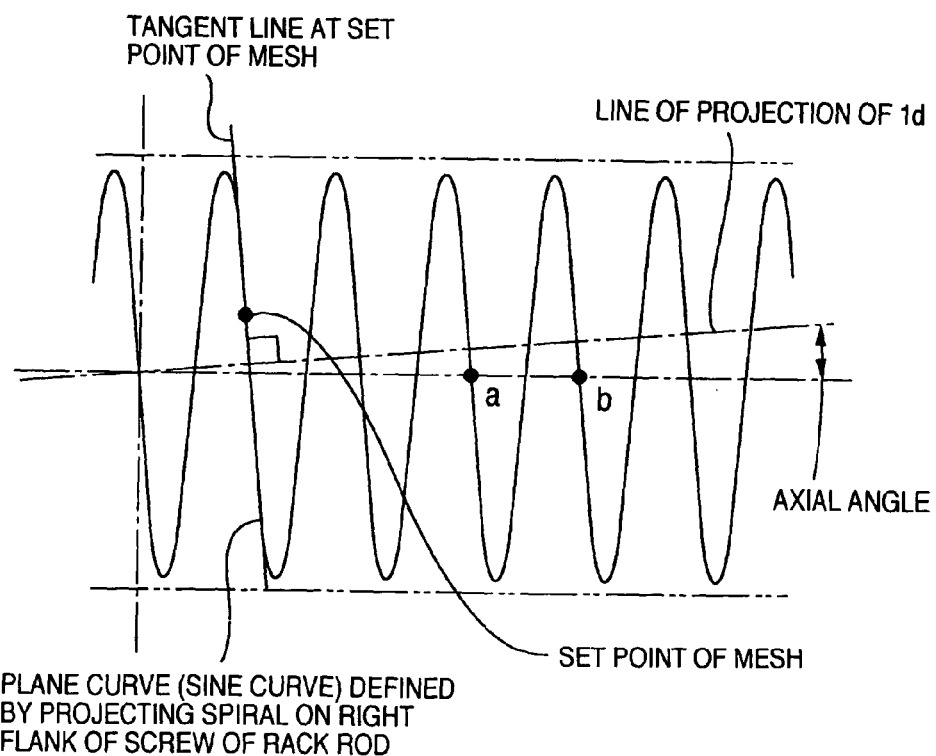
FIG. 18 is a view showing a plane curve (a sine curve) defined by projecting a thread spiral on a right thread flank in the fourth embodiment on a plane of projection.
Figure 19:
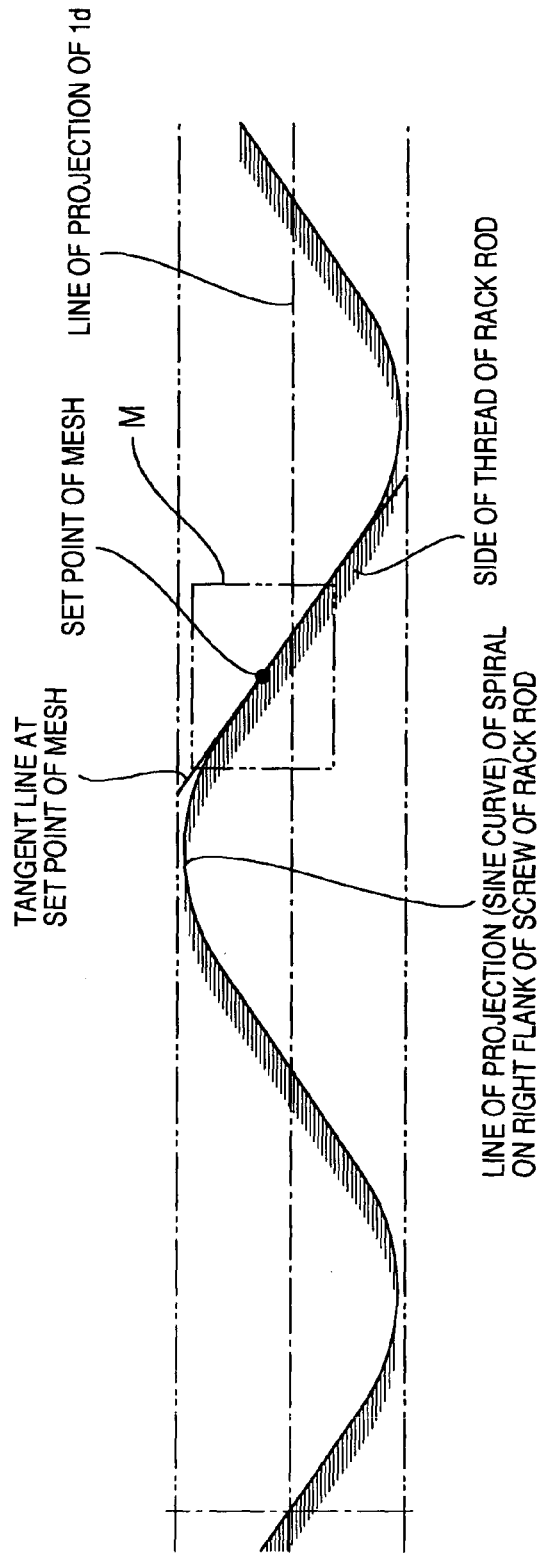
FIG. 19 is a view illustrating a point of mesh and drawn by enlarging FIG. 8 in a direction along the axis of the rack rod.

While the rack rod and the revolving rollers are arranged three-dimensionally, let consider a plane that is convenient for consideration of the positional relationship of the both. The plane is a plane of projection shown in a perspective view of FIG. 16. The plane passes through a point of mesh in the common parallel surface of the rack rod axis 1d and the revolving roller axis 21d to 24d. FIG. 17 is a view showing the rack rod as viewed in a direction (a direction of a common perpendicular shown in FIG. 16) normal to the common parallel surface. In FIG. 17, a point of mesh on a flank (a side of the thread) and a spiral on a right flank of the rack rod thread that passes therethrough are drawn. FIG. 18 shows a result of projection of a point of mesh on the flank and a spiral on the right flank of the rack rod thread, on the plane (a common parallel surface) of projection shown in FIG. 16.

The spiral assumes a sine curve, and in order that both planes come into contact with each other at a point K of mesh, it is required that the point of mesh be set in a position, in which a tangent line of the sine curve at least at the point K of mesh is perpendicular to a line of projection of the revolving roller axis. This corresponds to the fact that a line perpendicular to a line of projection of the revolving roller axis becomes in parallel to a tangent line at the point of mesh. This can also be understood from the fact that a line perpendicular to a line of projection of the revolving roller axis is regarded as projection of an annular surface of the revolving roller.

Points (for example, a, b, . . . in FIG. 18) having tangent lines in a direction perpendicular to the revolving roller axis are points of intersection of a line of projection of the rack rod axis 1d in the case where the revolving roller axis temporarily makes an axial angle of the revolving roller a lead of the thread.

Figure 20:
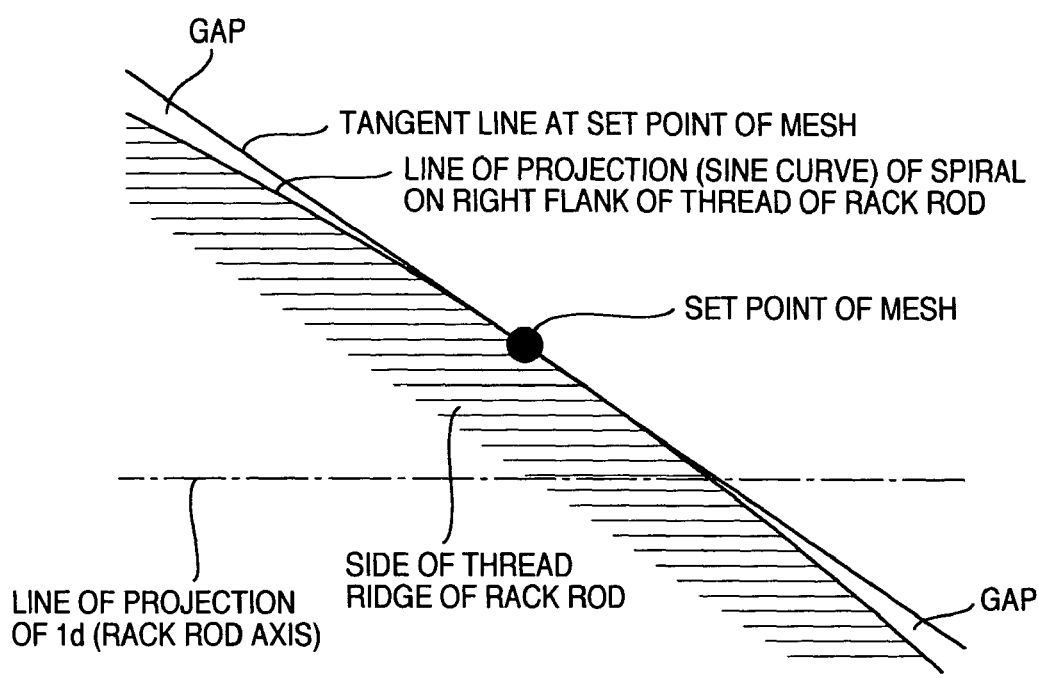
FIG. 20 is an enlarged view showing a M region in FIG. 19.

Accordingly, according to the feature of the embodiment, in the case where the axial angle shown in FIG. 12 is larger than a lead angle of the rack rod thread, that is, the revolving roller axis stands more erect than when the axial angle is equal to a lead angle, a position that can be set as a point of mesh is one, in which a tangent line at such position leans further than when the axial angle is equal to a lead angle, so that such position is one shown in FIG. 18. Since the relationship between a plane curve (sine curve) and a tangent line is not clear in FIG. 18, the curve is enlarged transversely in FIG. 19 to make the relationship between it and the tangent line easy to see, and FIG. 20 is an enlarged view showing a neighborhood (a M region in FIG. 19) of the point of mesh (a plane perpendicular to the sheet face of FIG. 20 becomes a flank surface of the thread). On the other hand, FIGS. 23 and 24 (an enlarged view showing a P region), which are illustrations similar to the figures, show the case where an axial angle is made a lead angle of the rack rod thread. A region indicated by fine hatching in FIG. 19 corresponds to a thread ridge of the rack rod shown in FIG. 17, and a plane perpendicular to the sheet face of FIG. 19 becomes a flank surface of the thread.

Figure 24:
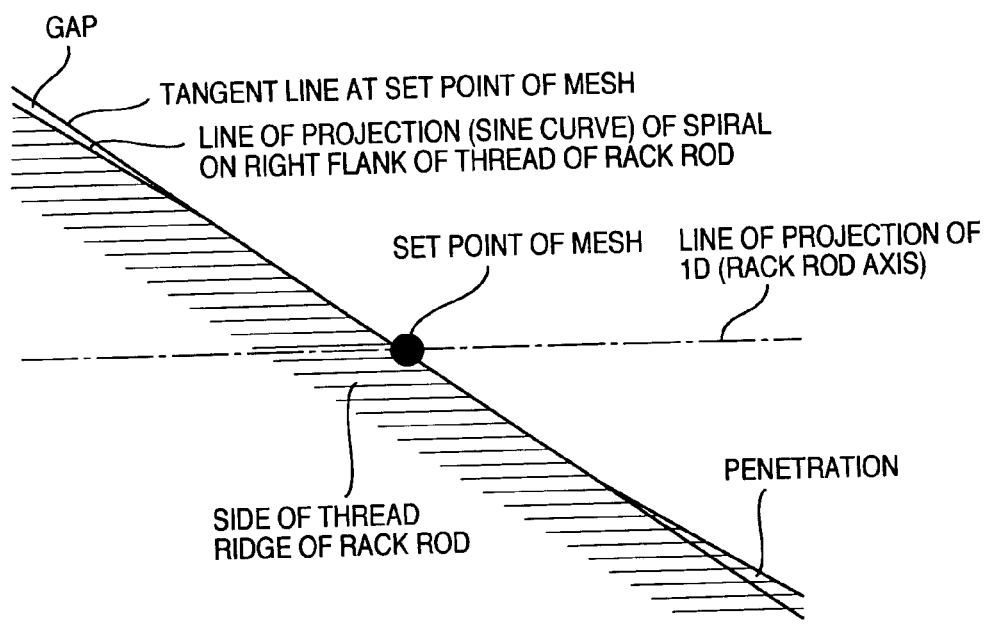
FIG. 24 is an enlarged view showing a P region in FIG. 23.

It is found that with the invention shown in FIG. 20, a tangent line at a set point of mesh gets out of position from the set point of mesh to separate from an edge of a thread ridge of the rack rod to generate a gap while with the case shown in FIG. 24, a tangent line penetrates into an edge of a thread ridge of the rack rod on a lower side of a set point of mesh. That is, in the case where an axial angle corresponds to a lead angle of the thread (the case shown in FIG. 24), contact can be realized at the set point of mesh but interference (an annular surface of a revolving roller penetrates into a thread ridge of the rack rod) occurs around the set point of mesh, while contact can be realized at a set point of mesh and interference therearound can be avoided with the invention shown in FIG. 20, in which an axial angle is made larger than a lead angle of the thread.

That is, in the vicinity of a point of mesh set so that a flank of a rack rod thread and an annular surface on a side of a groove of a revolving roller comes into contact with each other, it is possible to avoid interference between the both. As a result, since no excessive stress is generated locally, there is produced an effect that it is possible to bear a large stress near to a limit of a material over a wide area and to generate a large thrust while ensuring a high reliability.

Stated further, making a comparison between an example, in which an axial angle of a revolving roller corresponds to a thread lead angle, shown in FIG. 24 and the present embodiment, in which an axial angle of a revolving roller is made larger than a thread lead angle, shown in FIG. 20, a set point of mesh corresponds to a point of intersection (a, b, . . . shown in FIG. 18) of a line of projection of the rack rod axis 1d and a line of projection (a sine curve) of a thread spiral of a rack rod in the related art but corresponds to a point (a solid circle shown in FIG. 18) away from the rack rod axis 1d in the embodiment. The reason for this is as follows. In the case where a revolving roller is mounted from just above the figure in FIG. 17, since an axial angle of a revolving roller is equal to a thread lead angle in the related art, a point of mesh between a straight line defined by projection of an annular groove (not a spiral groove but a side of a groove perpendicular to a revolving roller axis) of a revolving roller and a sine curve defined by projection of a thread flank is on a line of projection of a rack rod axis. In contrast, according to the embodiment, since an axial angle of a revolving roller is made larger than a lead angle and a revolving roller is mounted from just above in FIG. 17, it is natural that a point of contact (a point of mesh), at which a straight line defined by projection of a side of an annular groove of a revolving roller comes into contact with a sine curve defined by projection of a thread of a rack rod, gets out of position from 1d (a line of projection of a thread axis) serving as a reference and the point of contact is disposed above the reference line 1d (since an axial angle of a revolving roller is made larger than a thread lead angle).

Further, while an annular groove in the case where an axial angle is made a lead angle of the rack rod thread penetrates below as shown in FIG. 24, FIG. 20 shows a configuration in the embodiment, in which gaps are formed on both sides of a point of mesh and no penetration occurs. The sine curve shown in FIG. 18 forms points of inflection (transition points of an upper convex shape of the curve and a lower concave shape of the curve) at points of intersection of the sine curve and the line 1d, and here a point of inflection generally has that attribute, by which one and the other of a curve relative to a tangent line drawn at the point of inflection are present on different sides, so that the tangent line in FIG. 24 forms a gap for the sine curve above the line 1d but it is present on the right of the sine curve therebelow. In contrast, according to the embodiment, the sine curve is positioned to get out of position upwardly from a point of inflection, a tangent line in the position forms gaps above and below the position as shown in FIG. 20.

Figure 21:
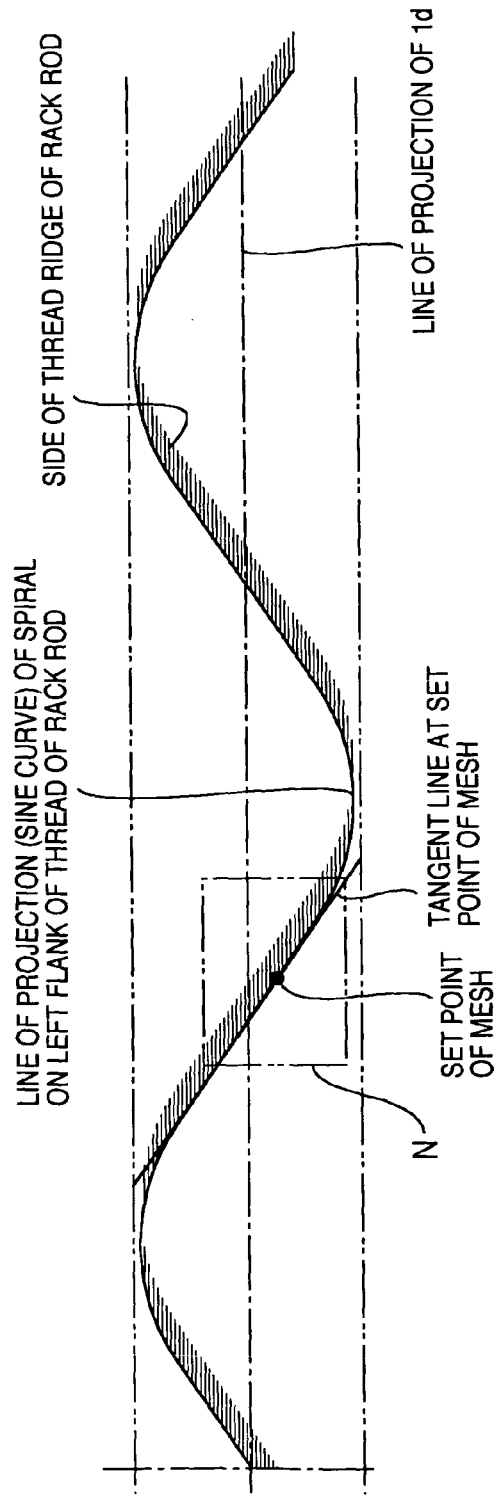
FIG. 21 is a view illustrating a point of mesh and drawn by enlarging a plane curve (a sine curve), which is defined by projecting a thread spiral on a left thread flank in the fourth embodiment on a plane of projection, in a direction along the axis of the rack rod.
Figure 22:
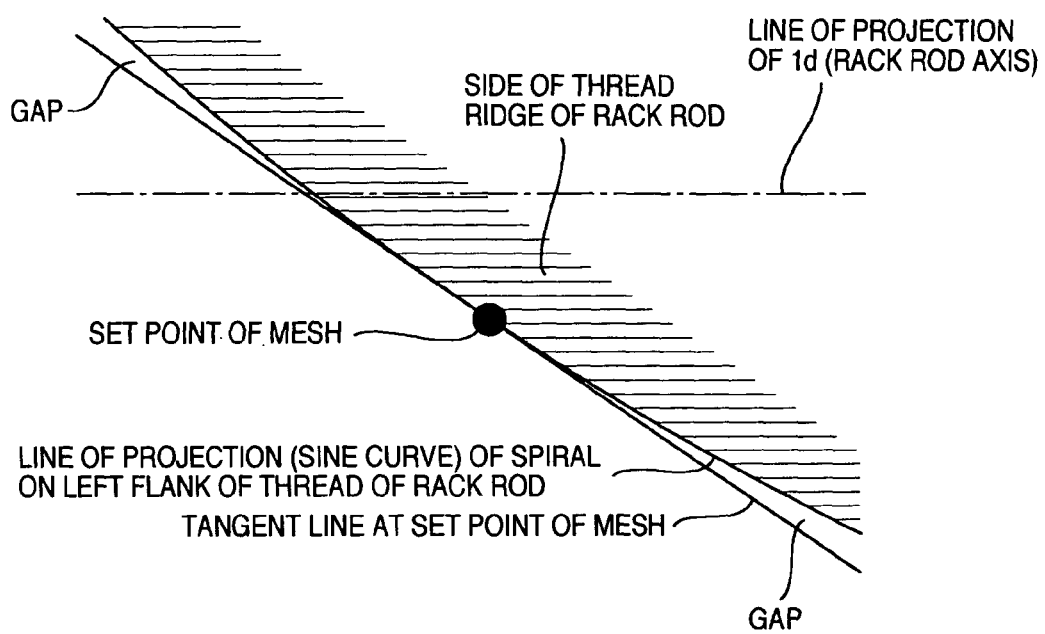
FIG. 22 is an enlarged view showing a N region in FIG. 21.

While the operation described above is performed in the case where the revolving rollers 21 to 24 revolve in directions, in which mesh occurs at a right flank of the rack rod thread 1a, the same operation as that described above is also performed in the reverse case where mesh occurs at a left flank of the rack rod thread 1a consequent upon the provision of the annular grooves 21b to 24b with both sides thereof defined by the two annular surfaces, which respectively mesh with both flanks being both sides of a thread ridge of the rack rod as shown in FIG. 13. FIGS. 21 and 22 are the same views as those of FIGS. 19 and 20. From these, it is found that a point of mesh gets out of position between the case where mesh occurs at a left flank of the rack rod thread 1*a* and the case where mesh occurs at a right flank (a set point of mesh in FIG. 22 is positioned below the line of projection 1*d*).

Figure 25:
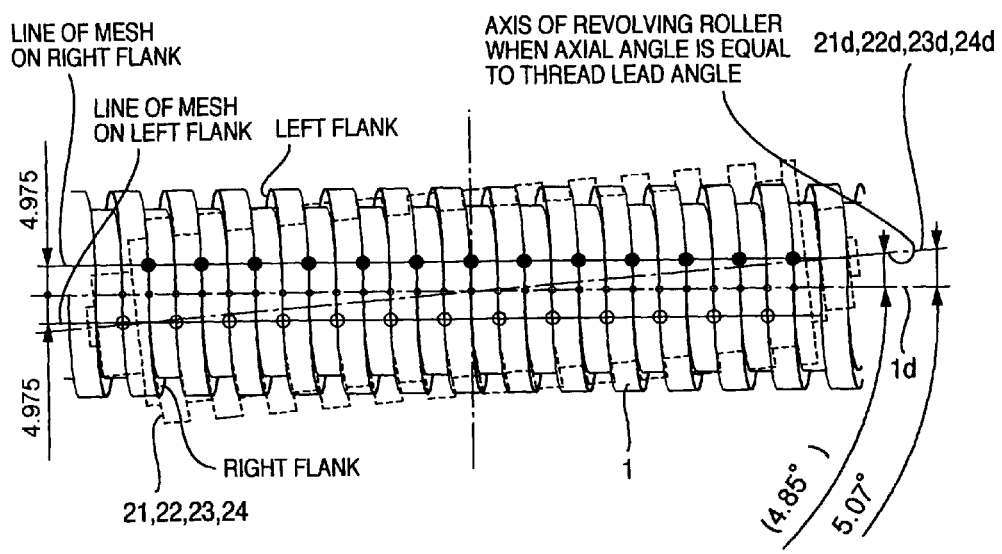
FIG. 25 is a view illustrating points of mesh on the thread of the rack rod in the fourth embodiment.

The situation described above is integrated in FIG. 25. As a result of combining annular surfaces of a revolving roller to make the annular grooves 21*b* to 24*b*, both flanks of the rack rod thread 1*a* are used as points of mesh (flanks used are different according to a direction of linear movement), so that there is produced an effect that time of loading in one point can be reduced to lead to an improvement in reliability. Also, as apparent from FIG. 25, it is found that points of mesh on right flanks and left flanks, respectively, are distributed on straight lines (the respective straight lines in FIG. 25 are called a right flank mesh line and a left flank mesh line). Based on the distribution of mesh, by applying torque in a direction, in which an axial angle is enlarged, to fix and arrange the revolving rollers 21 to 24 when the revolving rollers 21 to 24 are caused to mesh with the rack rod thread 1*a* (as a way to adjust a dimensional tolerance at the time of assembly of the revolving rollers), there is produced an effect of decreasing that play on the both mesh lines, which is generated by manufacturing errors of the revolving rollers 21 to 24 and the rack rod thread 1*a*.

Figure 32:
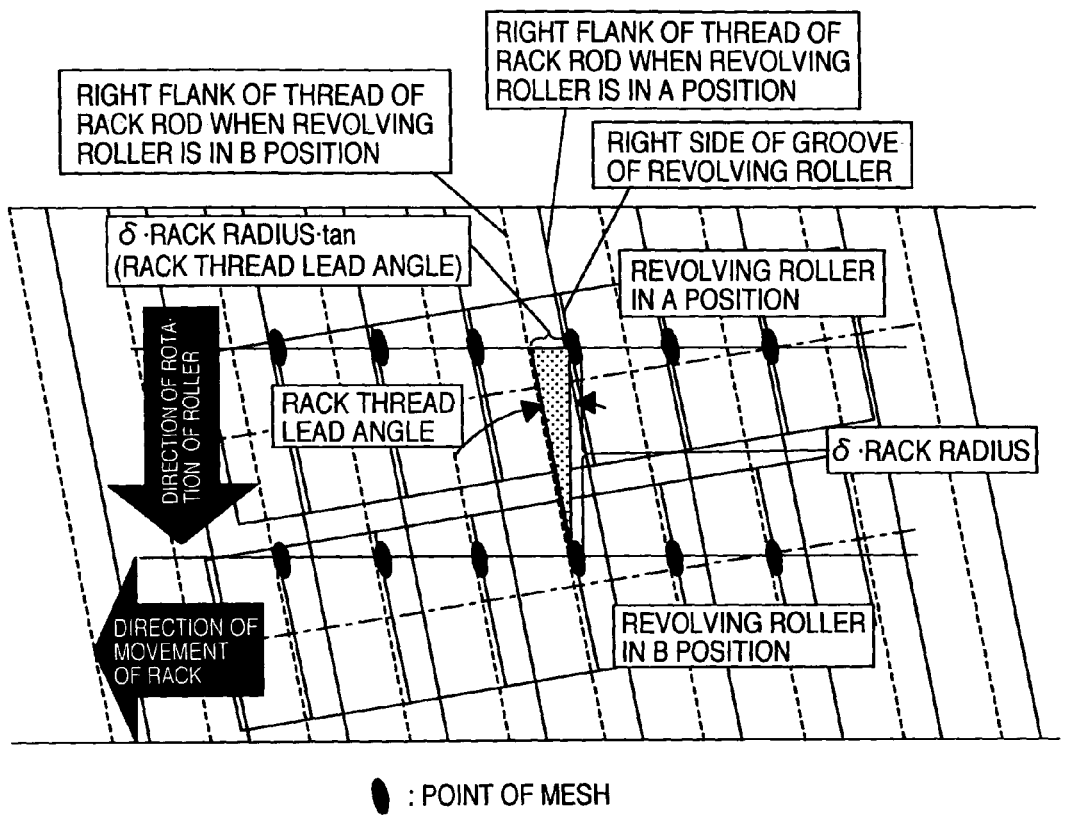
FIG. 32 is a view illustrating related motions of the thread of the rack rod and the revolving roller in the invention.

Subsequently, an operation of the embodiment will be described with reference to FIG. 32. FIG. 32 is a view showing, in development, an outer peripheral surface of the rack rod 1 for the purpose of explaining the principle of operation.

Now, let consider a limitative case of rotation downward from upward in FIG. 32. The holder member rotates about the rack rod axis and four revolving rollers held thereby also perform the same rotation as that of the motor. Therefore, the revolving rollers move vertically downward (B position) from upward (A position) in FIG. 32. Thick lines in FIG. 32 indicate right flanks of thread ridges of the rack rod when a revolving roller is in the A position.

Let consider the case where a revolving roller revolve $\delta$ radian to move $\delta$·(rack shaft radius) on a circumference of the rack rod to reach the B position. At this time, a position of a right annular surface of a revolving roller groove does not move in an axial direction of the rack rod but moves only vertically in development figure. Therefore, in the case where the rack rod moves $\delta$·(rack rod shaft radius)·tan (a lead angle of the rack rod thread) in the axial direction (in a left and right direction in development figure), right flanks of thread ridges move leftward to come to positions indicated by broken lines to maintain mesh of revolving roller grooves and the rack rod thread. In this manner, conversion of rotary motion into linear motion occurs.

A rack shift M (referred below to as mechanism pitch) per one rotation of the motor is represented $$M = 2\pi \cdot (\text{rack shaft radius}) \cdot \tan (\text{a lead angle of the rack rod thread})$$

where $\delta$ is $2\pi$. As apparent from the formula, it is found that the reduction ratio can be increased by decreasing a lead angle of the rack rod thread.

Points of mesh are positioned on annular surfaces on a side of a revolving roller and on a threaded surface of the rack rod, and thus surfaces (near planar surfaces) having small curvatures mesh with each other. Accordingly, since contact occurs over a wide area due to elastic deformation at the time of mesh, a maximum value of stress (Hertzian stress) as generated is restricted. Therefore, an applied load per one point of mesh increases to produce an effect that it becomes possible to generate a large thrust while being compact in construction. That is, while a ball-screw mechanism in the related art causes point contact between balls and a screw, a maximum value of stress as generated is restricted in the embodiment by contact close to planar surface contact at the time of mesh of the rack rod thread and the revolving rollers and by contact over a wide area due to elastic deformation of the both.

Frictional forces act at points of mesh in directions, in which relative slippage is gone, that is, associated elements move integrally. The frictional forces cause the revolving rollers to rotate on their own axes such that the revolving roller grooves roll on rails defined by thread ridges of the rack rod. Here, what is important is that even when the revolving rollers rotate on their own axes, the revolving roller grooves do not move axially at points of mesh. This is realized by the fact that the revolving roller grooves are defined not by threads but annular grooves. In this manner, since the revolving rollers for themselves control their rotating velocities so that the total friction at all points of mesh decreases, there is produced an effect that loss is small and a high efficiency is achieved. Summarizing the above, the invention can be regarded as a method of dividing a nut into freely rotating rollers to realize rolling contact.

By the way, when the rack rod 1 is caused to generate thrust, its reaction force comes out axially of the rack rod 1. Such reaction force finally applies at points of mesh of the rack rod thread 1*a* and the revolving roller grooves 21*b* to 24*b* of the respective revolving rollers. At this time, since a plurality of revolving roller grooves are provided on a single revolving roller in the embodiment, points of mesh are as many as the number of the grooves with the result that it is possible to withstand a large load. According to the embodiment, since the revolving rollers are mounted in plural (here, the four revolving rollers 21 to 24), points of mesh are further increased and it is correspondingly possible to withstand a large load with the result that it is possible to generate a large rack thrust.

Moreover, according to the embodiment, since the revolving rollers 21 to 24 are arranged at equiangular intervals round the rack rod 1, those components, which come out radially (radially about the rack rod axis 1*d*), out of forces coming out on the respective revolving rollers cancel one another not to come out. As a result, loads on the holder radial bearings 3*f* decrease whereby it is possible to use bearings of a small load carrying capacity therefor to contribute to reduction in cost and miniaturization and since friction loss generated there is also decreased, it is possible to contribute to an improvement in performance.

Here, taking into consideration assembly of the revolving rollers 21 to 24 into the holder member 3 (as a method of adjusting a dimensional tolerance with that construction, which is characteristic of the embodiment and in which axial angles of the revolving rollers are larger than a lead angle of the rack rod thread, as a prerequisite), the motor-side holder end plate 3*c* is temporarily fixed to the holder connecting parts 3*d*, which are made integral with the holder end plate 3*b*, by the holder connection screws 7 to provide a subassembly, the subassembly is inserted into the holder member casing 6*a*, and the rack rod 1 is screwed in centrally thereof.

Thereafter, the holder connection screws 7 thus temporarily fixed are once loosened, the motor-side holder end plate 3*c* is a little twisted to adjust biaxial angles between the revolving roller axes and the rack rod axis and to decrease play at points of mesh, and fixing is again performed. Then, since friction in the bearings is increased as play is decreased, twist is made appropriate. This means that play and efficiency can be readily adjusted in the final stage of assembly, so that the embodiment has an advantage that degree of play and dispersion in efficiency can be decreased. Capability of avoidance of play means that it is possible in steering devices to eliminate the presence of that dead zone, in which wheels are in no way responsive even when a steering wheel is manipulated, and can contribute to an improvement in feeling of steering.

According to the embodiment, the stator 5b of the motor 5 is provided on a side of the casing, the rotor 5a is provided on a side of the holder member 3, and although not shown, the rack and the pinion 103 are provided on the rack rod 1 to allow only translation of the rack rod 1 but to prevent rotation thereof as described above. Therefore, the rack rod 1 does not rotate but performs only translation, so that there is no fear that torque is transmitted to tie rods mounted at ends of the rack rod 1 and so there is an advantage that use is convenient.

Figure 26:
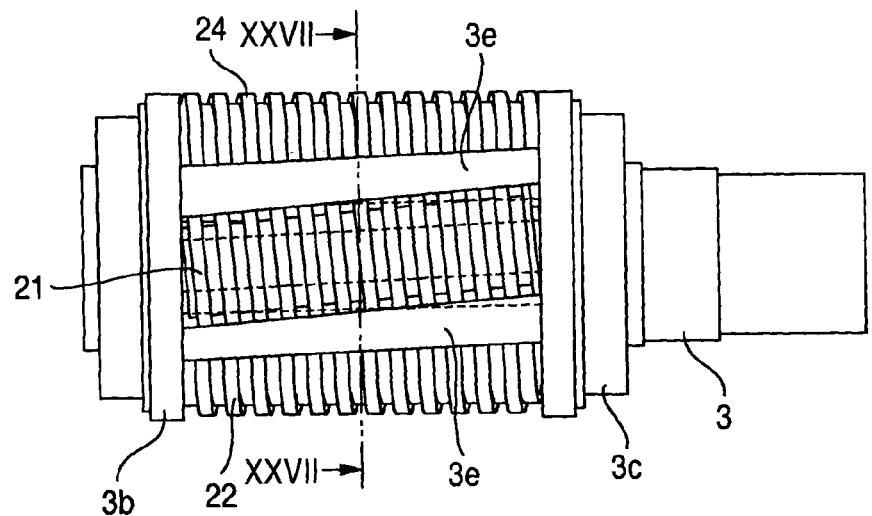
FIG. 26 is a side view showing a subassembly of revolving rollers and a holder member in a fifth embodiment of a mechanism for converting rotary motion into linear motion, according to the invention.
Figure 27:
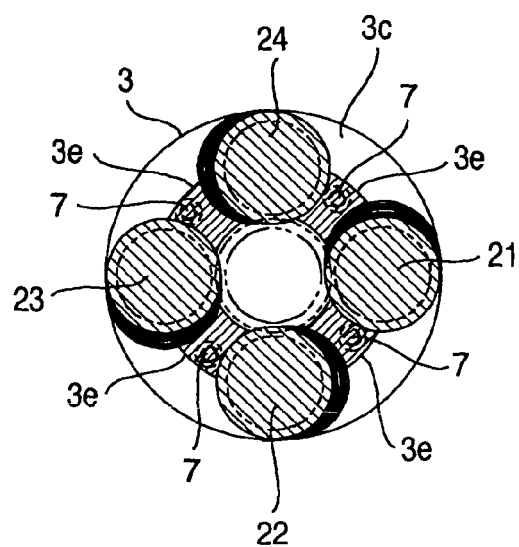
FIG. 27 is a transverse, cross sectional view showing the subassembly of the revolving rollers and the holder member in the fifth embodiment (a section taken along the line XXVII-XXVII in FIG. 26)

Subsequently, a fifth embodiment of the invention will be described with reference to FIGS. 26 and 27. FIG. 26 is a side view showing a subassembly of revolving rollers and a holder, and FIG. 27 is a cross sectional view showing the subassembly. Since the subassembly is the same as that in the fourth embodiment described above except that holder connecting parts are formed along the revolving rollers 21 to 24 arranged in twist relative to a rack rod to make holder twisted connecting parts 3e, a description for the construction, operation and effect of the remaining parts is omitted. The connecting parts may be shaped to be defined by hollowing round columns having a little larger outside diameter than that of the revolving rollers, out of those portions of a solid body integral with a holder end plate 3b, in which the revolving rollers will be arranged in twist. Thereby, the holder connecting parts can be made smaller in outside diameter than the holder connecting parts in the fourth embodiment since a cross sectional area can be readily ensured as compared with the latter. As a result, since the moment of inertia about a central axis, which defines an axis of rotation of the subassembly being a rotary part, can be decreased, there is produced a peculiar effect that responsibility for a command is improved to make control of an operation easy.

Figure 28:
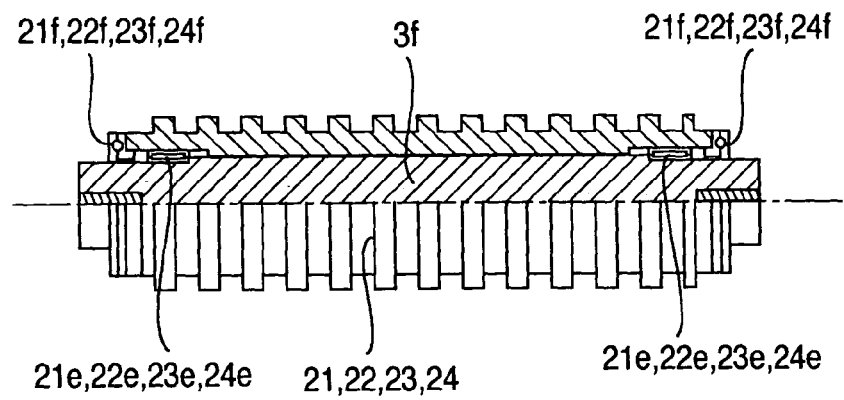
FIG. 28 is a side view showing a subassembly of revolving rollers and a holder member in a sixth embodiment of a mechanism for converting rotary motion into linear motion, according to the invention (a part of the view is a cross sectional view)
Figure 29:
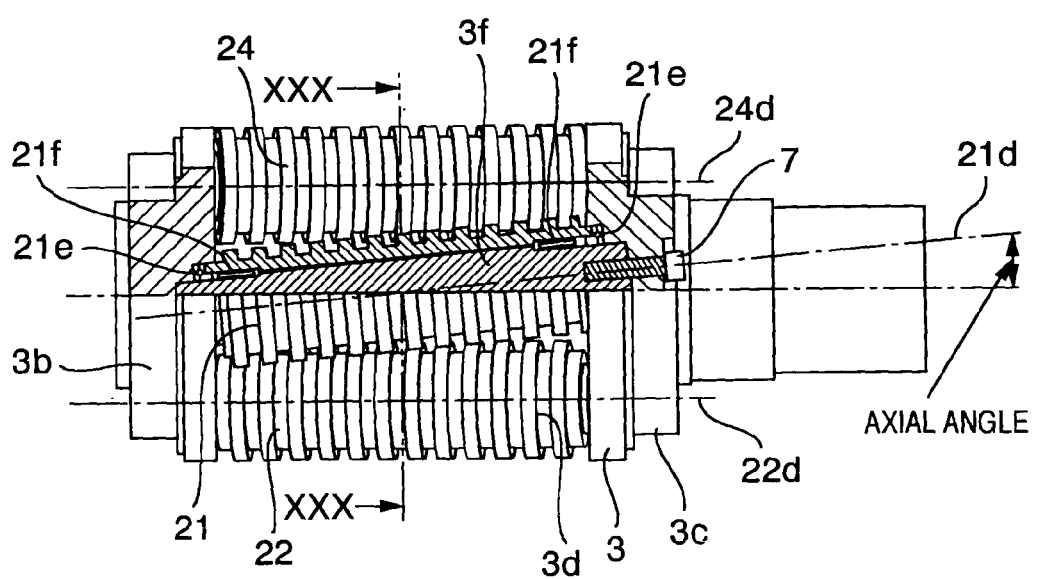
FIG. 29 is a side view showing the subassembly of the revolving rollers and the holder member in the sixth embodiment (a part of the view is a cross sectional view showing a section taken along the lines XXIX-XXIX in FIG. 30)
Figure 30:
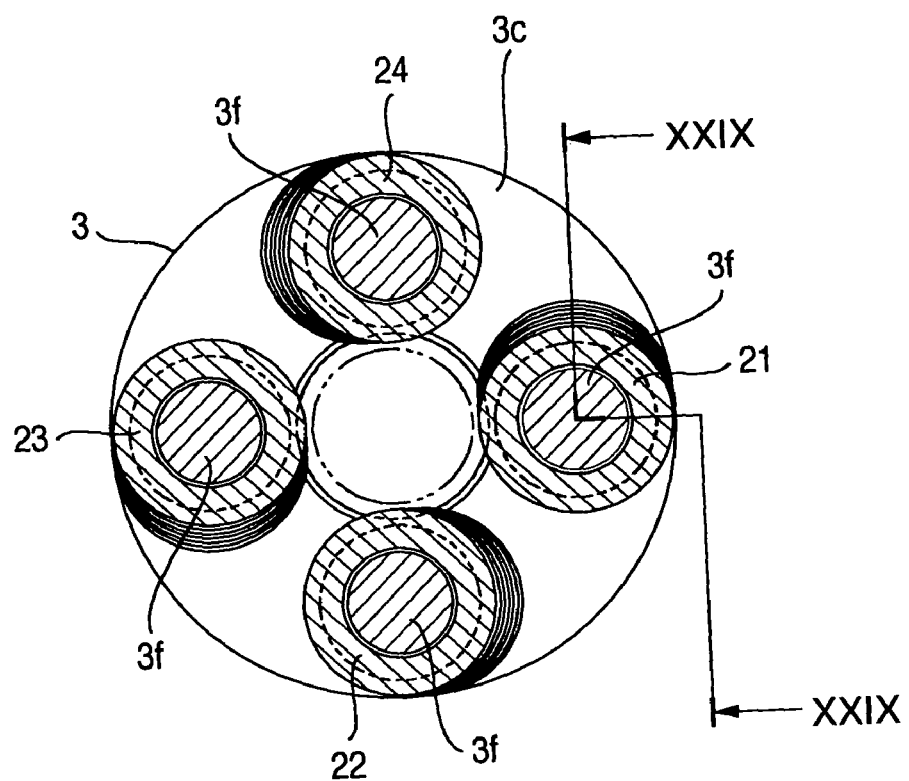
FIG. 30 is a transverse, cross sectional view showing the subassembly of the revolving rollers and the holder member in the sixth embodiment (a section taken along the line XX-XX in FIG. 29)

Subsequently, a sixth embodiment of the invention will be described with reference to FIGS. 28 to 30. FIG. 28 shows a subassembly, in which a shaft extends through a revolving roller 21 to 24 and revolving roller radial bearings 21f to 24f are built. In order to have the shaft serving as a holder connecting part, the shaft is referred to as a roller built-in holder connecting part 3f. FIG. 29 is a side view showing a subassembly of revolving rollers and holders, and shows, in cross section, a location, in which the roller built-in holder connecting part 3f is mounted. FIG. 30 is a transverse, cross sectional view showing the subassembly. Since the sixth embodiment is the same as the first and fifth embodiments described above except the subassembly, a description for the construction, operation and effect of the remaining parts is omitted.

Since the holder connecting part is provided inside the revolving roller, there is produced a peculiar effect that the moment of inertia can be further decreased relative to that in the fifth embodiment and responsibility for a command is improved to make control of an operation further easy. Also, since a member space for connecting the both holder end plates 3b, 3c except the revolving rollers is made unnecessary, there is also produced an effect that revolving rollers as mounted and worked can be increased in number to increase thrust further. While built-in revolving roller bearings in the embodiment comprise only a radial bearing, they may comprise an angular ball bearing and a taper roller bearing, which also serve as a thrust bearing. By doing this, there is produced an effect that roller shaft ends can be made simple in structure and an adjustment construction for axial positioning of revolving rollers is made simple. While revolving roller radial bearings in the embodiment comprise a needle bearing, they may of course comprise a ball bearing and a roller bearing.

While the revolving rollers described above are four in number, they are not limited thereto but may be any in number. Ideally, the revolving rollers are preferably three in number. Also, while the revolving rollers, for example, the revolving rollers 21 to 24 in any one of the embodiments are substantially the same in diameter as the rack rod 1, the revolving rollers in the embodiment of the invention can be made smaller in diameter than the rack rod so far as strength permits. In this case, the revolving rollers can be further increased in number whereby it is possible to cope with the case where a further large thrust is demanded.

In this manner, the invention has a first object to achieve a large thrust while ensuring a high reliability and a second object to lessen play although parts are somewhat low in accuracy, and so the invention includes the following embodiments in order to attain the objects.

The first object is attained by first means, which comprises a mechanism for converting rotary motion into linear motion, comprising a rack rod in the form of a round bar, a holder member supported round the rack rod to be rotatable relative to the rack rod, revolving rollers supported for rotation on the holder member, and a rotary drive source that rotates the holder member relative to the rack rod, wherein a thread is provided on an outer peripheral surface of the rack rod, an axial angle of each of the revolving rollers relative to an axis of the rack rod is set larger than a lead angle of the thread of the rack rod, and an annular surface (a plurality of annular grooves and a single annular groove shown in the drawings of the present application do not constitute an indispensable feature of the invention) is provided on an outer peripheral surface of each of the revolving rollers to mesh with a flank of the thread of the rack rod.

Also, the first object is attained by second means, which comprises an annular groove (a single annular groove) provided on an outer peripheral surface of each of the revolving rollers and including both side surfaces defined by two of the annular surfaces, which respectively mesh with both flanks of the thread of the rack rod, together with the first means.

Further, the first object is attained by third means, in which the annular grooves are provided in plural, together with the second means.

Also, the first object is attained by fourth means, in which when considering a plane curve formed by projecting that spiral of the thread of the rack rod, which passes through the point of mesh, on a plane, which is a common parallel plane of an axis of the revolving roller and the axis of the rack rod and passes through the point of mesh, the point of mesh is set in a position, in which a tangent line there is perpendicular to the axis of the revolving roller, together with the first, second and third means.

Also, the second object is attained by fifth means, in which when the revolving rollers are fixed meshing with the thread of the rack rod, fixation and arrangement can be achieved applying a force or torque in a direction, in which the axial angle of each of the revolving rollers is increased, together with the fourth means.

Also, the first and second objects are also attained by a mechanism for converting rotary motion into linear motion, comprising a rack rod in the form of a round bar, a holder member supported round the rack rod to be rotatable relative to the rack rod, revolving rollers supported for rotation on the holder member, and a rotary drive source that rotates the holder member relative to the rack rod, wherein a thread is provided on an outer peripheral surface of the rack rod, an axial angle of each of the revolving rollers relative to an axis of the rack rod is set to be larger than a lead angle of the thread of the rack rod, a plurality of annular grooves are provided on an outer peripheral surface of each of the revolving rollers, said annular grooves including side surfaces defined by annular surfaces, respectively, meshing with both flanks, which make both side surfaces of a thread ridge of the rack rod, and points of mesh every flank are distributed on a straight line in parallel to the axis of the rack rod.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mechanism for converting rotary motion into linear motion, comprising a cylindrical-shaped or columnar-shaped rack rod, a holder member supported round the rack rod to be rotatable relative to the rack rod, and revolving rollers supported for rotation on the holder member,
    wherein the rack rod comprises a thread having a predetermined lead angle,
    an axial angle of each of the revolving rollers relative to an axis of the rack rod is larger than the lead angle of the thread of the rack rod, and
    each of the revolving rollers is formed with a plurality of annular grooves on an outer peripheral surface thereof, and each annular groove has two-sided annular surfaces at least one of which meshes with a side flank of the thread of the rack rod,
    wherein each thread of the rack rod having a curvature that creates a line of connecting points of mesh between a right flank of each thread of the rack rod and each revolving roller, when each revolving roller rotates around the rack rod toward a direction in which the points of mesh occur at the right flank and a line of connecting points of mesh between a left flank of each thread of the rack rod and each revolving roller, when each revolving roller rotates around the rack rod toward a direction in which the points of mesh occur at the left flank, wherein the line of connecting points of mesh of the left flank and the line of connecting points of mesh of the right flank are parallel to each other and the axis of the rack rod.

2. A mechanism according to claim 1, wherein the revolving rollers revolve around the rack rod and rotate on their own axes.

3. A mechanism according to claim 1, wherein meshing points, in which the respective flanks of the rack rod and the respective annular surfaces of each of the revolving rollers mesh with each other, are set on a substantially straight line in parallel to the axis of the rack rod.

4. A mechanism according to claim 1, wherein the holder member comprises holder end plates that interpose therebetween the revolving rollers, and holder connecting parts that connect the end plates together, and
    the holder connecting parts are configured in a shape along the revolving rollers, which are arranged to be twisted relative to the rack rod.

5. A mechanism according to claim 1, wherein the holder member comprises holder end plates that interpose therebetween the revolving rollers, and holder connecting parts that connect the end plates together, and
    the holder connecting parts are configured to have shafts extending inside the revolving rollers, which are arranged to be twisted relative to the rack rod and serve as radial bearings for the revolving rollers.

6. A mechanism for converting rotary motion into linear motion, comprising a cylindrical-shaped or columnar-shaped rack rod, a holder member supported round the rack rod to be rotatable relative to the rack rod, and revolving rollers supported for rotation on the holder member,
    wherein the rack rod comprises a thread having a predetermined lead angle,
    an axial angle of each of the revolving rollers relative to an axis of the rack rod is larger than the lead angle of the thread of the rack rod,
    each of the revolving rollers is formed with a plurality of annular grooves on an outer peripheral surface thereof, and each annular groove has two-sided annular surfaces at least one of which meshes with a side flank of the thread of the rack rod, and
    meshing points of the at least one of two-sided annular surfaces and the side flank of the thread of the rack rod exist apart from the axis of the rack rod as viewed from a direction of a common perpendicular of the axis of the rack rod and the axis of the revolving roller,
    wherein each thread of the rack rod having a curvature that creates a line of connecting points of mesh between a right flank of each thread of the rack rod and each revolving roller, when each revolving roller rotates around the rack rod toward a direction in which the points of mesh occur at the right flank and a line of connecting points of mesh between a left flank of each thread of the rack rod and each revolving roller, when each revolving roller rotates around the rack rod toward a direction in which the points of mesh occur at the left flank, wherein the line of connecting points of mesh of the left flank and the line of connecting points of mesh of the right flank are parallel to each other and the axis of the rack rod.

7. A mechanism according to claim 6, wherein the two-sided annular surfaces respectively mesh with the side flanks of the thread of the rack rod.

8. A mechanism according to claim 7, wherein a plane curve drawn by vertically projecting a spiral of the thread of the rack rod passing through a point of mesh, in which the flank of the thread of the rack rod and the annular surface of each of the revolving rollers mesh with each other, to a common parallel plane, which is perpendicular to a common perpendicular of the axis of each of the revolving rollers and the axis of the rack rod, the point of mesh exists at a point other than in inflection point on the plane curve.

9. A mechanism according to claim 6, wherein the revolving rollers resolve around the rack rod and rotate on their own axes.

10. A mechanism according to claim 6, wherein a plane curve drawn by vertically projecting a spiral of the thread of the rack rod passing through a point of mesh, in which the flank of the thread of the rack rod and the annular surface of each of the revolving rollers mesh with each other, to a common parallel plane, which is perpendicular to a common perpendicular of the axis of each of the revolving rollers and the axis of the rack rod, the point of mesh exists at a point other than in inflection point on the plane curve.

11. A mechanism according to claim 6, wherein the meshing points are set on a substantially straight line in parallel to the axis of the rack rod.

12. A mechanism according to claim 6, wherein the holder member comprises holder end plates that interpose therebetween the revolving rollers, and holder connecting parts that connect the end plates together, and the holder connecting parts are configured in a shape along the revolving rollers, which are arranged to be twisted relative to the rack rod.

13. A mechanism according to claim 6, wherein the holder member comprises holder end plates that interpose therebetween the revolving rollers, and holder connecting parts that connect the end plates together, and the holder connecting parts are configured to have shafts extending inside the revolving rollers, which are arranged to be twisted relative to the rack rod and serve as radial bearing for the revolving rollers.

* * * * *